United States Patent [19]
Gray et al.

[11] Patent Number: 5,371,891
[45] Date of Patent: Dec. 6, 1994

[54] METHOD FOR OBJECT CONSTRUCTION IN A COMPILER FOR AN OBJECT-ORIENTED PROGRAMMING LANGUAGE

[75] Inventors: Jan Gray, Redmond; David Jones, Preston, both of Wash.; Martin O'Riordan, Bryanstown, Islamic Rep. of Iran

[73] Assignee: Microsoft Corporation, Redmond, Wash.

[21] Appl. No.: 866,820

[22] Filed: Apr. 9, 1992

[51] Int. Cl.$^5$ .............................................. G06F 9/45
[52] U.S. Cl. ............................. 395/700; 364/DIG. 1; 364/280.4
[58] Field of Search .................. 364/DIG. 1; 395/700

[56] References Cited

U.S. PATENT DOCUMENTS

| | | | |
|---|---|---|---|
| 5,129,083 | 7/1992 | Cutler et al. ................. | 364/DIG. 1 |
| 5,187,786 | 2/1993 | Densmore et al. ........... | 364/DIG. 1 |
| 5,206,951 | 4/1993 | Khoyi et al. .................. | 364/DIG. 1 |
| 5,297,284 | 3/1994 | Jones et al. ......................... | 395/700 |

*Primary Examiner*—Thomas M. Heckler
*Attorney, Agent, or Firm*—Seed and Berry

[57] ABSTRACT

An improved method and system for implementing constructors and destructors in a compiler for an object-oriented programming language is provided. In a preferred embodiment of the present invention, a construction displacement value is added to the this pointer for a virtual function that is invoked by a constructor for a class that virtually inherits a base class. The construction displacement value corresponds to the difference between the offset of an occurrence of a virtually inherited class within an instance of the base class and the offset of the occurrence of the virtually inherited class from the occurrence of the base class within an instance of a derived class that inherits the base class.

75 Claims, 13 Drawing Sheets

METHOD FOR OBJECT CONSTRUCTION IN A COMPILER FOR AN OBJECT-ORIENTED PROGRAMMING LANGUAGE

TECHNICAL FIELD

This invention relates generally to the field of compilers for computer programming languages and more specifically to compilers for languages having object-oriented features.

BACKGROUND OF THE INVENTION

The use of object-oriented programming techniques can facilitate the development of complex computer programs. Programming languages that support object-oriented techniques have been developed. One such programming language is C++.

Two common characteristics of object-oriented programming languages are support for data encapsulation and data type inheritance. Data encapsulation refers to the binding of functions and data. Inheritance refers to the ability to declare a data type in terms of other data types.

In the C++ language, object-oriented techniques are supported through the use classes. A class is a user-defined type. A class declaration describes the data members and function members of the class. For example, the following declaration defines data members and a function member of a class named CIRCLE.

```
class CIRCLE
{   int x, y;
    int radius;
    void draw();
};
```

Variables x and y specify the center location of a circle and variable radius specifies the radius of the circle. These variables are referred to as data members of the class CIRCLE. The function draw is a user-defined function that draws the circle of the specified radius at the specified location. The function draw is referred to as a function member of class CIRCLE. The data members and function members of a class are bound together in that the function operates an instance of the class. An instance of a class is also called an object of the class.

In the syntax of C++, the following statement declares the objects a and b to be of type class CIRCLE.
    CIRCLE a, b;
This declaration causes the allocation of memory for the objects a and b, such an allocation is called an instance of the class. The following statements assign data to the data members of objects a and b.

```
a.x     =   2;
a.y     =   2;
a.radius =  1;
b.x     =   4;
b.y     =   5;
b.radius =  2;
```

The following statements are used to draw the circles defined by objects a and b.
    a.draw();
    b.draw();

A derived class is a class that inherits the characteristics—data members and function members—of its base classes. For example, the following derived class CIRCLE_FILL inherits the characteristics of the base class CIRCLE.

```
class CIRCLE_FILL : CIRCLE
{   int pattern;
    void fill();
};
```

This declaration specifies that class CIRCLE_FILL includes all the data and function members that are in class CIRCLE in addition to the those data and function members introduced in the declaration of class CIRCLE_FILL, that is, data member pattern and function member fill. In this example, class CIRCLE_FILL would have data members x, y, radius, and pattern and function members draw and fill. Class CIRCLE_FILL is said to "inherit" the characteristics of class CIRCLE. A class that inherits the characteristics of another class is a derived class (e.g., CIRCLE_FILL). A class that does not inherit the characteristics of another class is a primary class (e.g., CIRCLE). A class whose characteristics are inherited by another class is a base class (e.g., CIRCLE is a base class of CIRCLE_FILL). A derived class may inherit the characteristics of several classes, that is, a derived class may have several base classes. This is referred to as multiple inheritance.

A derived class may specify that a base class is to be inherited virtually. Virtual inheritance of a base class means that only one instance of the virtual base class exists in the derived class. For example, the following is an example of a derived class with two non-virtual base classes.
    class PATTERN: CIRCLE, CIRCLE{ ... };
In this declaration class PATTERN inherits class CIRCLE twice non-virtually. There are two instances of class CIRCLE in class PATTERN.

The following is an example of a derived class with two virtual base classes.
    class PATTERN: virtual CIRCLE, virtual CIRCLE{ ... };
The derived class PATTERN inherits class CIRCLE twice virtually. Since the class CIRCLE is virtually inherited twice, there is only one object of class CIRCLE in the derived class PATTERN. This is the simplest use of virtual inheritance and is not particularly useful. One skilled in the art would appreciate virtual inheritance can be very useful when the class derivation is more complex.

A class may also specify whether its function members are to be virtually inherited. Declaring that a function member is virtual means that the function can be overridden by a function of the same name and type in a derived class. In the following example, the function draw is declared to be virtual in classes CIRCLE and CIRCLE_FILL.

```
class CIRCLE
{   int x, y;
    int radius;
    virtual void draw();
};
class CIRCLE_FILL : CIRCLE
{   int pattern;
    virtual void draw();
};
```

Continuing with the example, the following statement declares object a to be of type class CIRCLE and object b to be of type class CIRCLE_FILL.

```
CIRCLE a;
CIRCLE_FILL b;
```

The following statement refers to the function draw as defined in class CIRCLE.

```
a.draw();
```

Whereas, the following statement refers to the function draw defined in class CIRCLE_FILL.

```
b.draw();
```

Moreover, the following statements type cast object b to an object of type class CIRCLE and invoke the function draw that is defined in class CIRCLE_FILL.

```
CIRCLE c;
c_ptr *CIRCLE;
c_ptr = &b;
c_ptr->draw();    // CIRCLE_FILL::draw()
```

Thus, the type casting preserves the call to the overriding function CIRCLE_FILL::draw.

The C++ language provides for the automatic initialization during construction of an object at run time. A special class member function (a constructor) is invoked implicitly whenever an object is declared or allocated through a "new" operator. A constructor is a user-supplied initialization function that has the same name as that of the class. In the following example, a constructor (function member CIRCLE) is defined for class CIRCLE.

```
class CIRCLE
{   int x, y;
    int radius;
    virtual void draw();
    CIRCLE()    {x=2; y=2; radius=1};
};
```

Continuing with the example, the following statement declares object a to be of type class CIRCLE and initializes the data members x, y, and radius to 2, 2, and 1, respectively. During construction, the constructor CIRCLE is invoked to perform the initialization.

```
CIRCLE a;
```

If the constructor was not supplied for class CIRCLE, then an object could be initialized explicitly by the following statements.

```
CIRCLE a;
a.x =       2;
a.y =       2;
a.radius =  1;
```

A constructor may invoke a non-virtual or a virtual function member of the class or of a base class of the class. In the following example, the constructor for class CIRCLE invokes the virtual function clear.

```
class CIRCLE
{   int x, y;
    int radius;
    virtual void draw();
    virtual void clear()    {x=0; y=0; radius=0};
    CIRCLE()    {clear()};
};
```

The virtual function member clear sets each of the data members to a 0 value. The constructor invokes function member clear to initialize the data members of the object. The virtual function member clear could be explicitly invoked after initialization to clear the data members.

As described above, the class CIRCLE may be virtually inherited and the virtual function members of class CIRCLE may be overridden in the derived class. In the following example, class CIRCLE_FILL virtually inherits class CIRCLE, overrides virtual function member clear, and defines a constructor.

```
class CIRCLE_FILL : virtual CIRCLE
{   int pattern;
    void fill();
    virtual void clear ()    {pattern=0};
    CIRCLE_FILL ()    {clear()};
}
```

The function member clear sets the data member pattern to a zero value. During initialization of an object of type class CIRCLE_FILL, the constructor for class CIRCLE is invoked to initialize the occurrence of the class CIRCLE object in the CIRCLE_FILL object. Then, the constructor for class CIRCLE_FILL is invoked to initialize the CIRCLE_FILL object. From the above description, it might be anticipated that the constructor CIRCLE would invoke the function member CIRCLE_FILL::clear because it overrides the function member CIRCLE::clear. Recall that as described above, normally the overriding functions are invoked for an object. If this were the case with the constructors, then after an object of type class CIRCLE_FILL was initialized, it would have the data member pattern initialized, but data members x, y, and radius would not be initialize. Although this result might be expected, it might be desirable to have all the data members initialized.

To achieve this desired result (and other results that one skilled in the art would be aware of, such as, not accessing unconstructed objects during construction), the C++ language specifies that a constructor that invokes a virtual function will not invoke an overriding function, but rather invokes the function defined in the class of the constructor. Thus, in the above example, when an object of type class CIRCLE_FILL is initialized, the constructor for class CIRCLE invokes function member CIRCLE::clear, rather than CIRCLE_FILL::clear. After initialization is complete, each of the data member of the object will be initialized to 0.

SUMMARY OF THE INVENTION

It is an object of the present invention to provide an improved method and system for constructing an object in an object-oriented programming environment.

It is another object of the present invention to provide a method and system of invoking a constructor of a base class wherein the constructor invokes a virtual function which overrides a virtual function defined in a class virtually inherited by the base class.

It is another object of the present invention to provide a method and system for correctly determining an object address that is accessed by a virtual function during construction of the object.

These and other objects, which will become apparent as the invention is more fully described below, are obtained by an improved method and system for implementing constructors and destructors in a compiler for an object-oriented programming language. In a preferred embodiment of the present invention, a construction displacement value is added to the this pointer for a virtual function that is invoked by a constructor. The construction displacement value corresponds to the difference between the offset of an occurrence of a virtually inherited class within an instance of a base class and the offset of the occurrence of the virtually inherited class from the occurrence of the base class within an instance of a derived class that inherits the base class.

DETAILED DESCRIPTION OF THE INVENTION

Figure 1A:
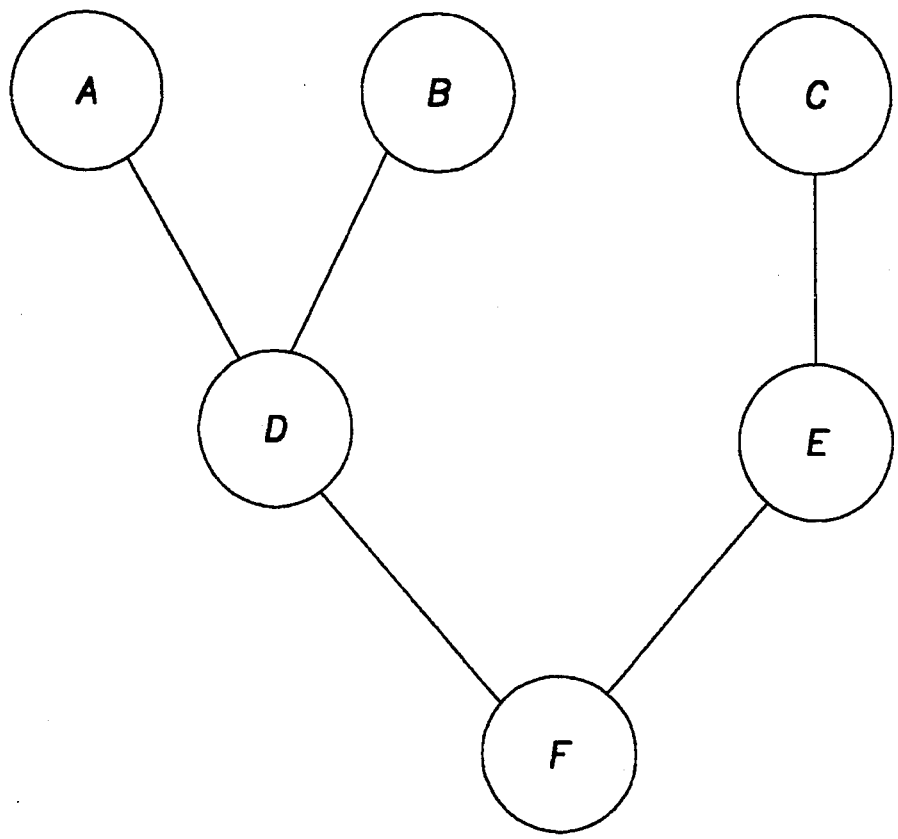
FIG. 1A shows the inheritance tree for class F.

The present invention provides an improved method and system for implementing constructors and destructors in a compiler for an object-oriented programming language. A preferred embodiment of the present invention is C++ compiler that implements constructors and destructors as described herein. Although the present invention is described in terms of a compiler for the C++ programming language, one skilled in the art would know that the methods of the present invention are applicable to other programming languages that support constructors or destructors.

Compilers for the C++ language generally generate code that incorrectly constructs and destructs objects for certain classes. In particular, when a derived class invokes a constructor or a destructor for a base class that virtually inherits a class, and the base class defines a virtual function that overrides a virtual function defined in the virtually inherited class, and the constructor or destructor invokes the overriding virtual function, then an object for the derived class may be incorrectly constructed or destructed.

In a preferred embodiment, the compiler defines a data structure for each class. If a class declares a base class to be virtual, then the compiler allocates a virtual base table for the class. If a class introduces a virtual function, then the compiler allocates a virtual function table for the class. The class data structure contains the layout of the data members and internal pointers. The internal pointers are virtual base table pointers and virtual function table pointers. These pointers are initialized during run time to point to the virtual base table and virtual function table associated with the class. During compile time, the compiler initializes the virtual function tables with pointers corresponding to virtual functions and initializes the virtual base tables with offsets into the class data structure corresponding to the location of virtually inherited classes.

CLASS DATA STRUCTURES

The compiler defines a data structure for each class. The data structure specifies the run-time storage allocation for each instance of the class. The data structure contains allocations for the data members of the class and for internal pointers used to implement virtual functions and virtual classes. The data structure for a derived class also contains the data structure for each base class. The data structure of a base class within a derived class is referred to as an occurrence of the base class within the derived class.

The class data structure for a primary class that has no virtual function members consists of the data members allocated in order of appearance in the class declaration. In a preferred embodiment, the data members in any data structure have the same alignment characteristics as the C++ struct data type.

The class data structure for a primary class that has a virtual function member consists of a virtual function table pointer followed by the data members allocated in order of appearance in the declaration.

The data structure for a derived class varies depending on the characteristics of the derived class and the base classes. In a preferred embodiment, the data structure for a derived class consists of:

(1) a virtual function table pointer, if the derived class defines a virtual function member that is not defined in a base class and if there is no non-virtual base class that has a virtual function table associated with it, (2) a virtual base table pointer, if there is a virtual base class and if there is no non-virtual base class that has a virtual base table pointer associated with that non-virtual base class, (3) an occurrence of each non-virtual base class in the left-to-right order specified in the list of base classes in the declaration, (4) the data members declared in the derived class allocated in order of appearance in the declaration, and (5) an occurrence of each virtual base class in the order as visited in a depth-first, left-to-right traversal of the inheritance tree (described below) of the derived class.

A derived class is a direct descendant of the base classes listed in the declaration. Conversely, the base classes listed in the declaration are direct ancestors of a derived class. An inheritance tree is the ancestral relationship of the direct and indirect ancestors of a class. FIG. 1A shows the inheritance tree for class F. Class F and its ancestor classes are defined below.

```
class A{ ... };
class B{ ... };
class C{ ... };
class D:   A, B{ ... };
class E:   C { ... };
class F:   D, E{ ... };
```

Class F directly descends from base classes D and E and indirectly descends from classes A, B, and C. Classes A, B, C, D, and E are base classes of class F. Classes D and E are direct base classes of class F. Classes A, B, and C are indirect base classes of class F. A depth-first, left-to-right traversal of this inheritance tree would visit the nodes in the following order: F, D, A, B, E, C. One skilled in the art would recognize that this traversal is a preorder traversal of the inheritance tree defined by the following recursive procedure.

```
Preorder_Traversal(Tree)
begin
    visit root of Tree
    for each direct ancestor of Tree in left-
        to-right order
    SubTree = the tree rooted at the direct
        ancestor
    call Preorder_Traversal(SubTree)
end
```

Although preferred embodiments use a depth-first, left-to-right traversal of the inheritance tree, one skilled in the art would appreciate that other methods of traversing the inheritance tree may be used. Similarly, preferred embodiments scan the direct base class list in a left-to-right ordering. However, other orderings may be used.

VIRTUAL FUNCTION TABLE

A virtual function table for a class contains addresses corresponding to the virtual function members associated with that class. The virtual function table is used at run time to invoke the virtual functions indirectly. Each primary class with a virtual function member has an associated virtual function table. The virtual function table contains the addresses of each virtual function member in order of declaration. The class data structure for such a class contains a virtual function table pointer (vfptr). When memory for a class data structure is allocated at run time (during construction), the virtual function table pointer is initialized with the address of the associated virtual function table. Thus, all objects of certain class type point to the same virtual function table. To implement the invoking of a virtual function, the compiler generates code to access the virtual function member through the virtual function table.

A derived class inherits a copy of the virtual function tables associated with its direct base classes. Also, a derived class that introduces a virtual function member either has an additional virtual function table or shares one of the inherited virtual function tables. A class is said to "introduce" a virtual function member if there are no other virtual function members of the same name and type in a base class. Such a derived class shares the virtual function table with the first non-virtual base class with an associated virtual function table that is visited in a depth-first, left-to-right traversal of the inheritance tree, if such a base class exists. Otherwise, the derived class has its own virtual function table. The derived class shares a virtual function table by appending the entries for the function members introduced in the derived class to the shared virtual function table.

In a preferred embodiment, the compiler generates code to invoke virtual functions indirectly through the virtual function table associated with the invoking object.

VIRTUAL BASE TABLES

A virtual base table contains, for each virtual direct base class, the offset between the address of the derived class and the address of the occurrence of the virtual direct base class in the derived class. The address of a class is described below. The virtual base tables are used at run time to access the occurrences of the virtual base classes.

The data structure for a derived class with an associated virtual direct base class includes a virtual base table pointer. Such a derived class shares the virtual base table pointer with the first non-virtual base class with an associated virtual base table that is visited in a depth-first, left-to-right traversal of the inheritance tree, if such a base class exists. The sharing of a virtual base table pointer means that the derived class and the base class share the same virtual base table. When a virtual base table is shared, the virtual base table is extended to include the offsets of the occurrences for the virtual direct base classes in the derived class that are not inherited by the base class whose virtual base table pointer is being shared. All functions that access the data members of a virtual base class access the data member through a virtual base table.

The entries in a virtual base table are ordered according to a left-to-right ordering of the virtual base classes in the declaration of the derived class.

CLASS ADDRESS

The address of an instance of a class is the address of the virtual function table pointer, if the class has one or shares one. Otherwise, the address of an instance of a class is the address of the virtual base table pointer, if the class has one or shares one. Otherwise, the address of an instance of a class is the address of the occurrence of the left-most non-virtual direct base class in the declaration, if there is such a base class. Otherwise, the address of an instance of a class is the address of the first data member in the class.

THIS POINTER

In the C++ language, the "this" pointer points to the object for which a function is called. The word "this" is a reserved word in the C++ language. In a preferred embodiment, the this pointer is passed to the function as hidden argument.

For non-virtual function members, the this pointer is the address of the object associated with the call.

For virtual function members, the this pointer is the address of the occurrence of the introducing class in the object associated with the call. A function defined in the introducing class expects that it is passed such a this pointer value. If the function is overridden, the overriding function may logically adjust the this pointer by the offset between the address of the object and the address of the occurrence of the introducing class within the object. This logical adjustment allows the overriding function to access the entire object of the class in which the overriding function is declared. In a preferred embodiment, explicit adjustment of the address may not be necessary because the offset can usually be incorporated into another computation or address formation.

Because an overriding function can be shared by many occurrences of a class or many different classes, there are two cases in which the this pointer needs to be adjusted before a function is invoked. In these cases, adjustor routines (i.e., thunks) are used to adjust the this pointer value before the function is invoked.

The first case occurs when a function member in a derived class overrides a function member that is defined in more than one base class, including when a class that defines the function occurs more than once in the inheritance tree. In this case, the overriding function is compiled expecting that the this pointer is set to the address of the "introducing class." The "introducing class" for a function is the first class visited in a depth-first, left-to-right traversal of the inheritance tree that introduces the function. For each class, except the introducing class, in which the function is overridden, an adjustor is created. The adjustor modifies the this pointer and then invokes the overriding function. The adjustor modifies the this pointer by the offset between the address of the occurrence of the introducing class and the address of the occurrence of the class for which the function is invoked. To override the address of the virtual function, the address of the adjustor is placed in the virtual function table corresponding to the occurrence of the class in which the function is defined. Thus, when the overriding function is invoked for an occurrence of a class for which an adjustor is created, the compiled program retrieves the address of the adjustor from the virtual function table and calls the adjustor. The adjustor then adjusts the this pointer and jumps to the overriding function. The virtual function table of the occurrence of the introducing class within the derived class contains the address of the overriding function, no adjustor is needed.

The second case occurs when a derived class has a base class that overrides a function member in a virtual base class and the derived class itself does not override the function member. In this case, the overriding function is compiled to expect the this pointer to be set to the address of the introducing class, the virtual class. To access an object for the class that virtually inherits the introducing class, the overriding function logically adjusts the this pointer by the offset of the occurrence of the introducing class and the address of the object. For the class that virtually inherits the introducing class, the address of the overriding function is placed in the virtual function table associated with the virtually inherited class. However, when such a class is itself used as a base class, the offset between occurrence of the virtual base class and the occurrence of the base class in the derived class may be different than the offset that the overriding function expects. In such case, an adjustor is used for the overriding function. The adjustor adjusts the this pointer to account for the difference between the offsets. The address of the adjustor is placed in the virtual function table associated with occurrence of the virtual class in the derived class. Thus, when the overriding function is called for an object of the derived class, the adjustor is invoked. The adjustor adjusts the this pointer by the difference in the offsets so that the overriding function correctly computes the address of the introducing class. The adjustor then invokes the overriding function.

Figure 1:
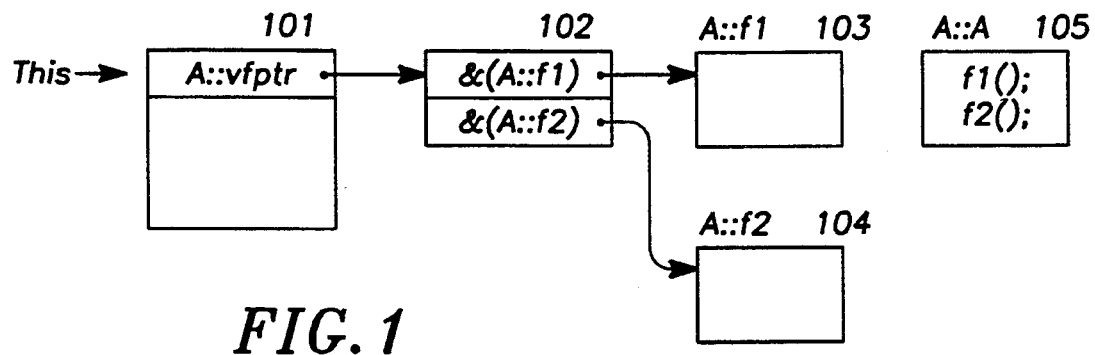
FIG. 1 is a schematic diagram of the class data structure, virtual function table, functions, and constructor for class A.
Figure 2:
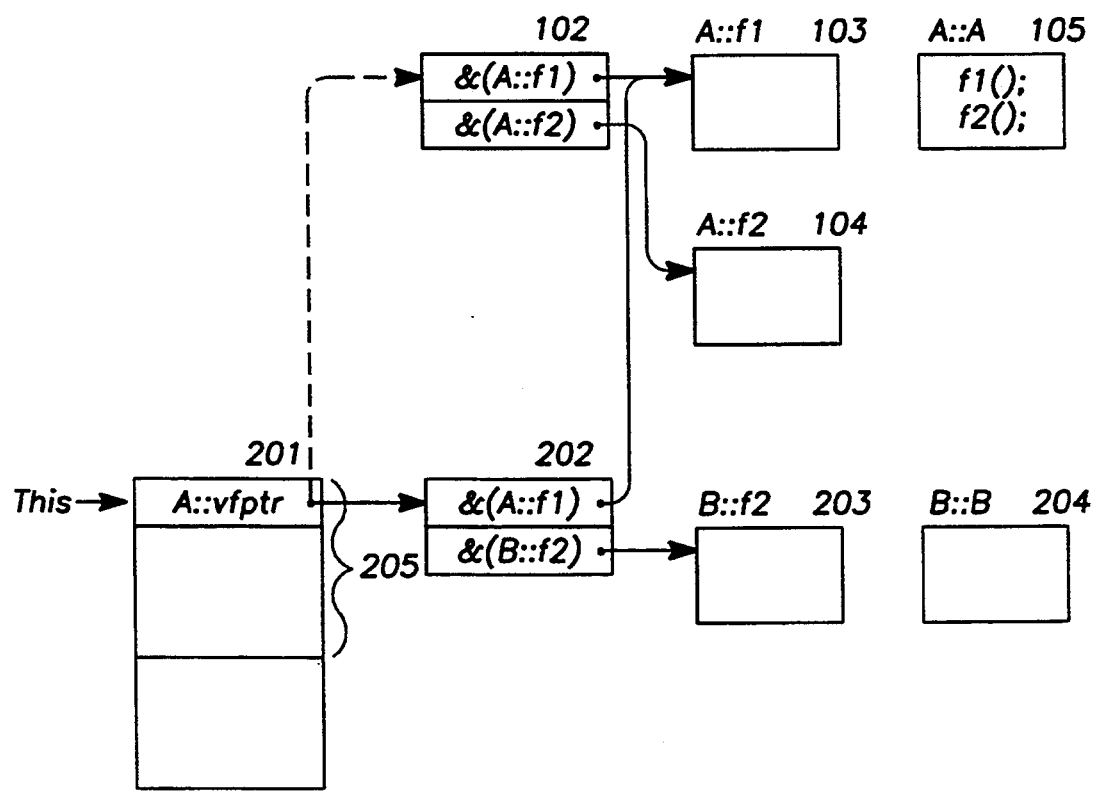
FIG. 2 is a schematic diagram of the data structure, virtual function table, and function for class B, and the virtual function table, functions, and constructor of class A.

In a preferred embodiment, a compiler for the C++ programming language temporarily sets the virtual function table pointer for an object that inherits a class to point to the virtual function table associated with the inherited class when the constructor for the inherited class is invoked. FIGS. 1 and 2 show the temporary setting of a virtual function table pointer during construction of an object. The following class definitions are for the example of FIGS. 1 and 2.

```
class A
{ ...
    virtual int f1();
    virtual int f2();
    A () {f1();f2()};
};
class B: A
{ ...
    virtual int f2();
    B();
};
```

FIG. 1 is a schematic diagram of the class data structure 101, virtual function table 102, functions 103 and 104, and constructor 105 for class A. The virtual function pointer A::vfptr points to the virtual function table 102, which contains the addresses of the virtual functions A::f1 103 and A::f2 104. During construction of an object of class A, constructor 105 is invoked. Constructor 105 is passed the this pointer for data structure 101 and invokes virtual functions A::f1 103 and A::f2 104 through the virtual function table 102.

FIG. 2 is a schematic diagram of the data structure 201, virtual function table 202, and function 203 for class B, and the virtual function table 102, functions 103 and 104, and constructor 105 of class A. After construction is complete, the virtual function pointer A::vfptr points to virtual function table 202. Virtual function table 202 contains the address of function A::f1 103 and of function B::f2 203, which overrides function A::f2 104. During construction of class B, the constructor 105 is first invoked to initialize the occurrence 205 of class A within the data structure 201 and then constructor 204 is invoked to initialize the class B object. To initialize the occurrence of object A, constructor 105 invokes virtual functions A::f1 103 and A::f2 104. However, virtual function table 202 contains the address of the overriding function B::f2 203 rather than function A::f2 104. Consequently, if constructor A::A 105 is invoked with A::vfptr pointing to virtual function table 202, the constructor will invoke function B::f2 203, rather than function A::f2 104. To avoid this problem, the virtual function table pointer A::vfptr is temporarily (indicated by the dashed line) set to point to virtual function table 102 while constructor A::A 105 is invoked. The temporary setting of the virtual function table pointer A::vfptr ensures that the constructor A::A accesses function A::f2 104, rather than function B::f2 103.

Figure 3:
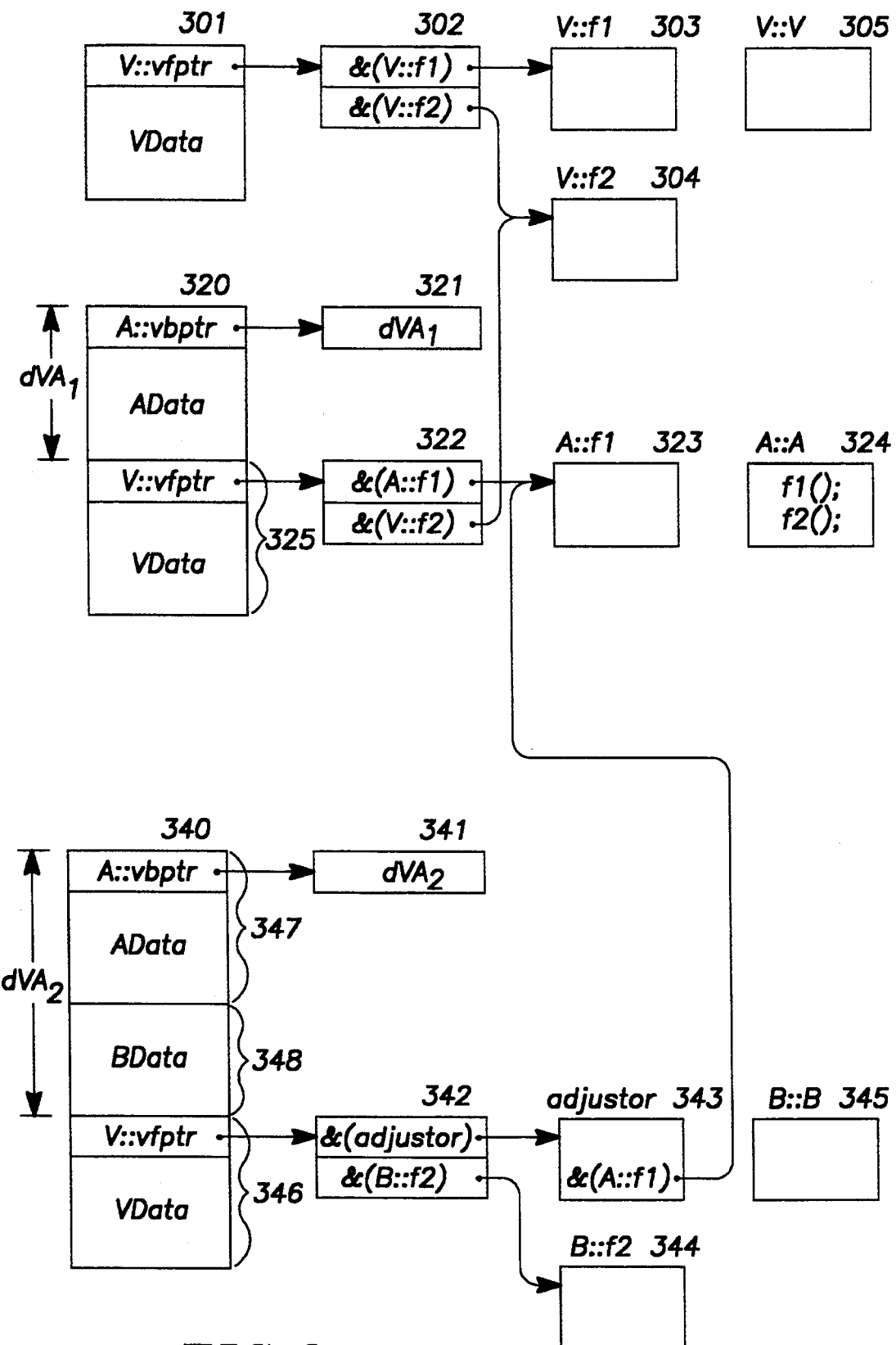
FIG. 3 is a diagram showing the post-construction data structures, virtual function tables, virtual base tables, and functions for classes V, A, and B in a preferred embodiment.

FIG. 3 is a diagram showing the post-construction data structures, virtual function tables, virtual base tables, and functions for classes V, A, and B in a preferred embodiment. Classes V, A and B are defined by the following statements.

```
class V
{ ...
    virtual int f1();
    virtual int f2();
    V();
};
class A : virtual V
{ ...
    virtual int f1();
    A() {f1();f2();};
};
class B : A
{ ...
    virtual int f2();
    B();
};
```

In a preferred embodiment, the techniques for generating an object data structure layout are described in U.S. patent application Ser. No. 07/682,537, entitled "A Method for Implementing Virtual Functions and Virtual Bases in a Compiler for an Object-Oriented Programming Language," which is hereby incorporated by reference.

The structures for class V includes data structure 301, virtual function table 302, virtual functions 303 and 304, and constructor 305. Data structure 301 comprises virtual function table pointer V::vfptr and the data members. The virtual function table pointer V::vfptr points to virtual function table 302. Virtual function table 302 contains the addresses of virtual functions V::f1 303 and V::f2 304. The constructor for class V is constructor V::V 305. The class address for an object of class V is the address of V::vfptr.

The structures for class A includes data structure 320, virtual base table 321, virtual function table 322, virtual function 323, and constructor 324. Data structure 320 comprises an occurrence of the class V 325, virtual base table pointer A::vbptr and the data members of class A. The class address for an object of class A is the address of the virtual base table pointer A::vbptr. The virtual base table pointer A::vbptr points to the virtual base table 321. The virtual base table 321 contains the offset of the occurrence of object V from the class address of object A. This offset allows a function to determine the address of the occurrence of the virtually inherited object of class V. The virtual function table pointer V::vfptr points to virtual function table 322. Virtual function table 322 contains the addresses of the virtual functions A::f1 323 and V::f2 304. The function A::f1 323 overrides the function V::f1 303 that is defined in class V. Constructor A::A for class A invokes virtual functions f1 and f2.

The structures for class B include data structure 340, virtual base table 341, virtual function table 342, adjustor 343, virtual function 344, and constructor 345. Data structure 340 contains an occurrence of class V 346, an occurrence of class A 347, and the data members of class B 348. The class address for an object of class B is the address of the virtual base table pointer A::vbptr. The virtual base table pointer A::vbptr contains the address of the virtual base table 341. The virtual base table 341 contains the offset of the occurrence of object V from the class address of object B. Virtual function table pointer V::vfptr contains the pointer to the virtual function table 342. The virtual function table 342 contains the address of adjustor 343 and the address of virtual function 344. Adjustor 343 performs the following adjustment of the this pointer and transfers to function A::f1 323.

this $-= dVA_2 - dVA_1$
go to &(A::f1)

Function A::f1 323 was compiled assuming that the this pointer points to virtual function table pointer V::vfptr, which is a distance of $dVA_1$, from the class address of an object of class A. Thus, function A::f1 323 would subtract $dVA_1$ from the this pointer to determine the location of A::vbptr. However, when function A::f1 323 is invoked for an object of class B, the this pointer points to V::vfptr, which is a distance $dVA_2$ from the class address of an object of class B. Thus, if function A::f1 323 is invoked with a this pointer pointing to the virtual function table pointer V::vfptr in an object of class B, it would subtract $dVA_1$, to incorrectly determine the address of virtual base table pointer A::vbptr in class B. The adjustor 343 adjusts the this pointer so that function A::f1 323 will correctly access the virtual base table pointer A::vbptr in class B. The adjustor then transfers control to function A::f1 323.

Figure 4:
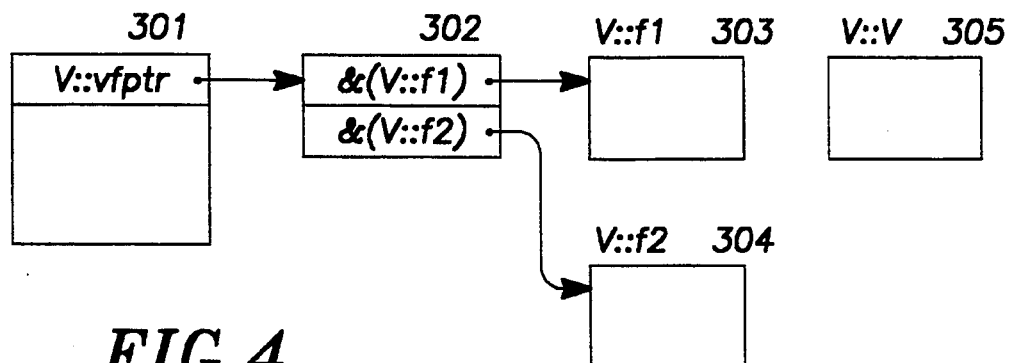
FIG. 4 is a schematic diagram of a class V object before the constructor for class V is invoked.

FIG. 4 is a schematic diagram of a class V object before the constructor for class V is invoked. If the constructor 305 invokes virtual functions f1 or f2, the constructor 305 is compiled expecting that the virtual function table pointer V::vfptr points to virtual function table 302. Thus, the constructor 305 accesses the virtual function f1 or f2 through the virtual function table 302. Functions f1 and f2 expect the this pointer to point to virtual function table pointer V::vfptr, the virtual function table pointer V::vfptr to point to virtual function table 302, and the virtual function table 302 to contain the addresses of functions V::f1 303 and V::f2 304.

Figure 5:
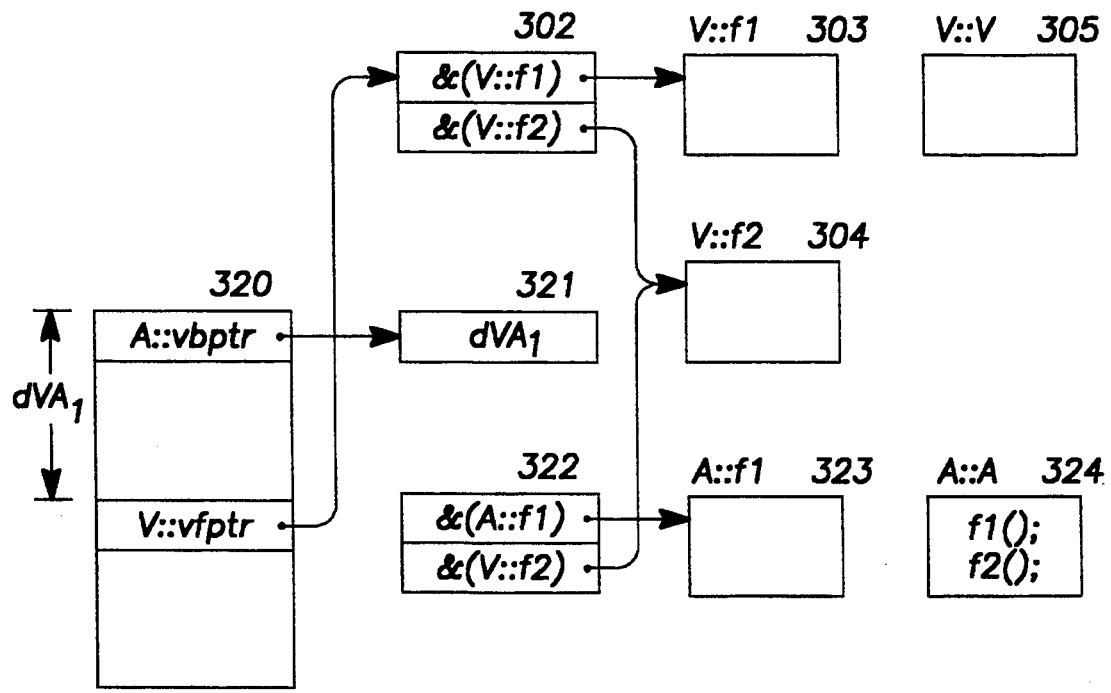
FIG. 5 is a schematic diagram of a class A object before the constructor of class V is invoked.

FIG. 5 is a schematic diagram of a class A object before the constructor of class V is invoked. During construction of a class A object, the virtual function table pointer V::vfptr is temporarily set to point to the virtual function table 302 of class V. When the constructor V::V 305 for class V is invoked, the this pointer points to the virtual function table pointer V::vfptr within object A. If constructor 305 invokes virtual function f1, then constructor 305 will access virtual function table 302, rather than virtual function table 322. Thus, constructor 305 invokes function V::f1 303, rather than the overriding function A::f1 323.

Figure 6:
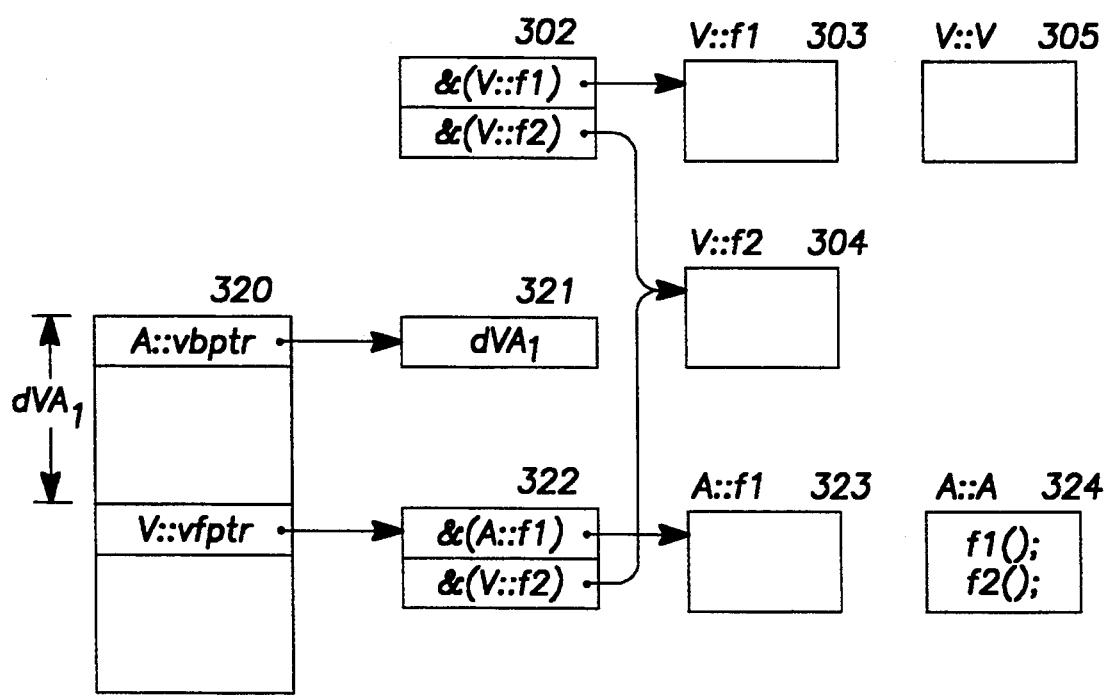
FIG. 6 is a schematic diagram of a class A object before the constructor of class A is invoked.

FIG. 6 is a schematic diagram of a class A object before the constructor of class A is invoked. The constructor A::A 324 invokes virtual functions f1 and f2. Before the constructor 324 is invoked, the virtual function table pointer V::vfptr is set to point to the virtual function table 322. Thus, constructor 324 will invoke function V::f2 304 and overriding virtual function A::f1 323.

Figure 7:
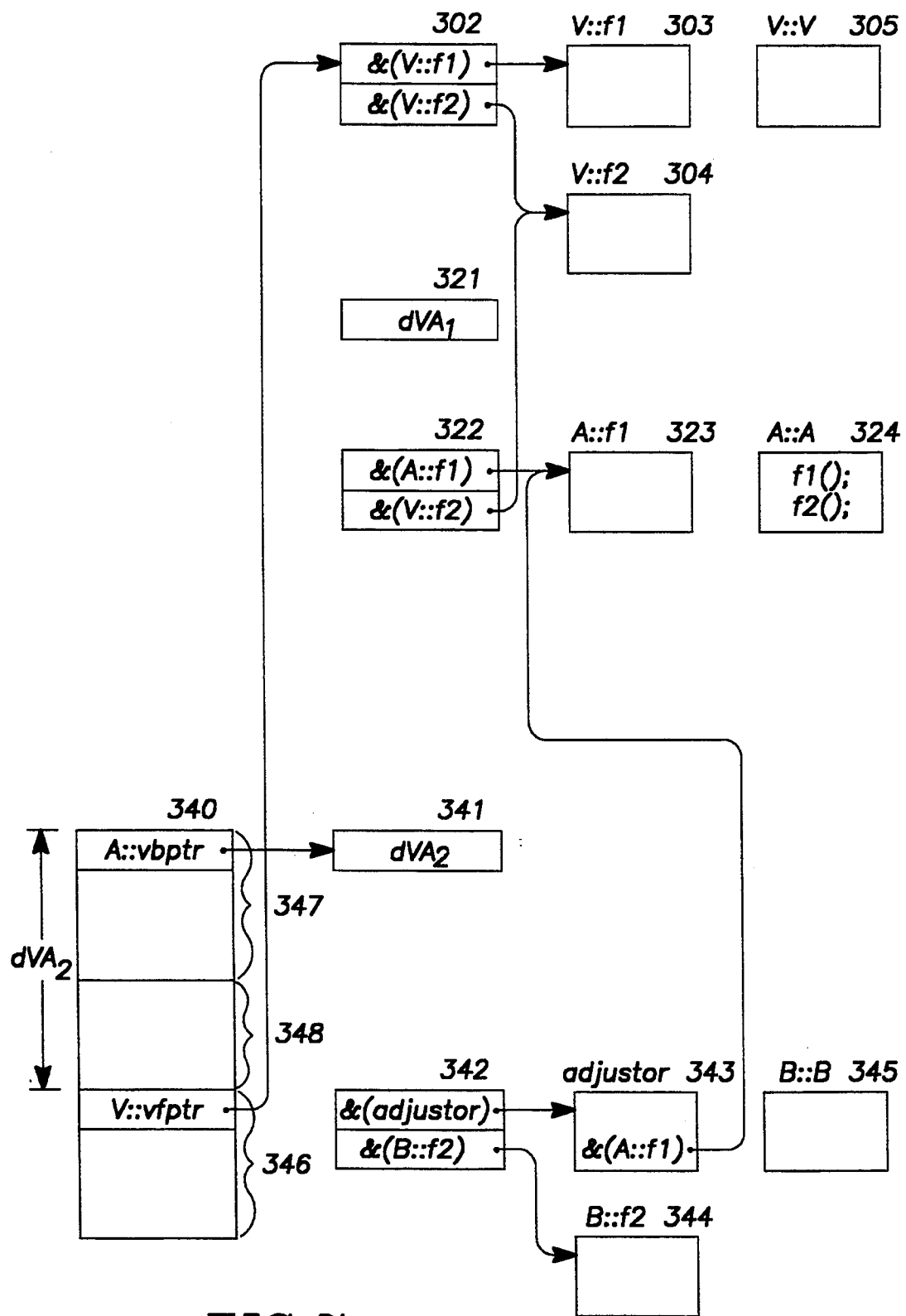
FIG. 7 is a schematic diagram of a class B object before the constructor of class V is invoked.

FIG. 7 is a schematic diagram of a class B object before the constructor of class V is invoked. During construction of a class B object, the virtual function table pointer V::vfptr is temporarily set to point to the virtual function table 302 of class V. When the constructor V::V 305 for class V is invoked, the this pointer points to the virtual function table pointer V::vfptr of class B. If constructor V::V 305 invokes virtual functions f1 or f2, then constructor V::V 305 will access virtual function table 302, rather than virtual function table 342. Thus, constructor V::V 305 will invoke virtual functions V::f1 303 or V::f2 304, rather than overriding functions A::f1 323 or B::f2 344.

Figure 8:
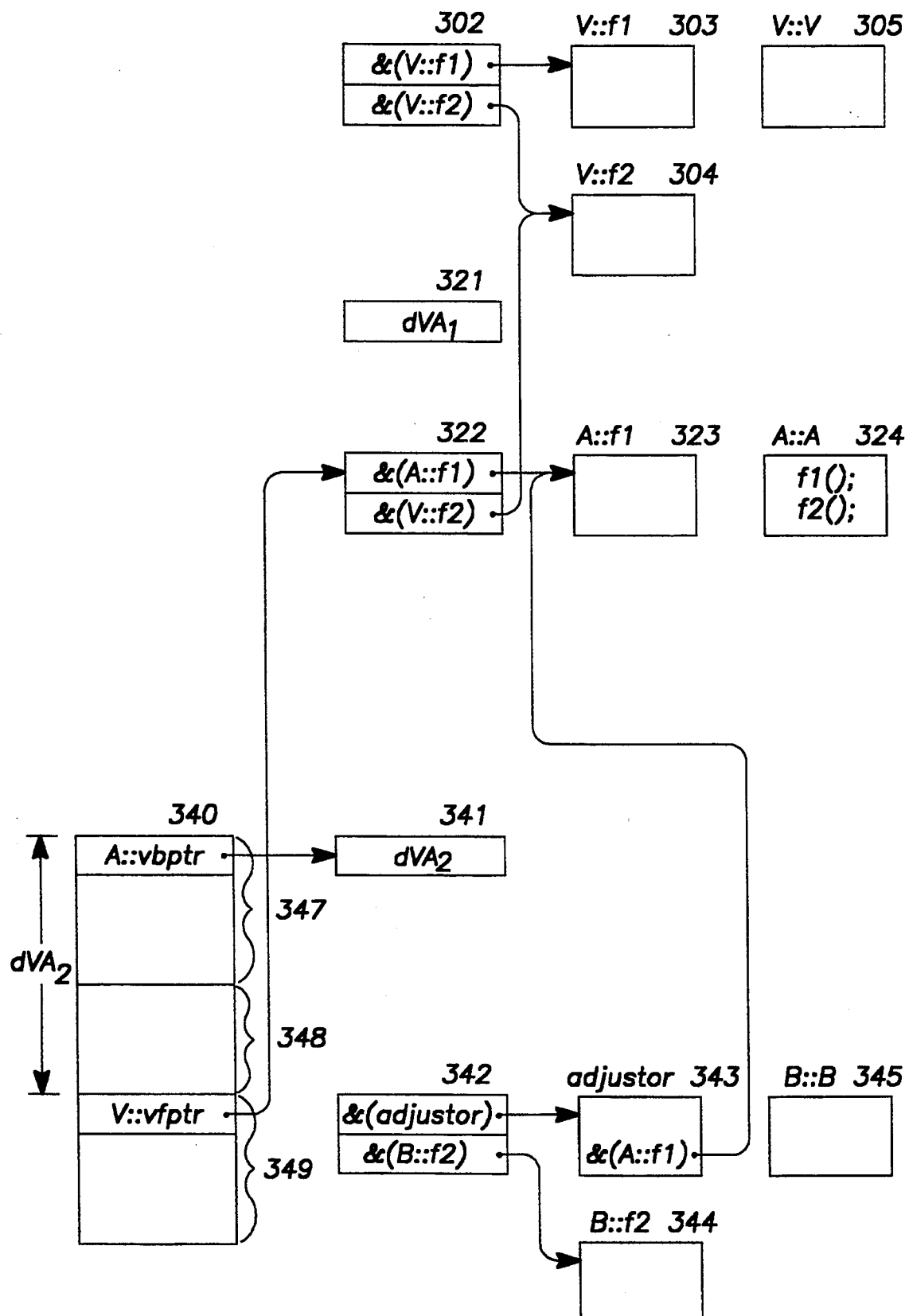
FIG. 8 is a schematic diagram of a class B object before the constructor of class A is invoked.

FIG. 8 is a schematic diagram of a class B object before the constructor of class A is invoked. During construction of a class B object, the virtual function table pointer V::vfptr is temporarily set to point to the virtual function table 322 of class A. When the constructor A::A 324 for class A is invoked, the this pointer points to the virtual function base pointer A::vbptr of class A. Constructor A::A 324 invokes virtual functions f1 and f2. Virtual function table 322 contains the addresses of functions A::f1 323 and V::f2 304. Before constructor A::A 324 invokes virtual function A::f1 323, it sets the this pointer for the invoked function. Constructor A::A 324 sets the this pointer to the sum of the value of $dVA_2$ in the virtual base table 341 and the value of the this pointer passed to constructor A::A 324. Thus, the this pointer for function A::f1 323 points to V::vfptr of class B. Recall that function A::f1 323 was compiled expecting that the this pointer points to virtual function table pointer V::vfptr in class A, which is an offset of $dVA_1$ from the virtual base table pointer A::vbptr in class A. Thus, when function A::f1 323 is invoked from constructor A::A 324, it will incorrectly calculate the location of the virtual base table pointer A::vbptr in class B as the this pointer minus $dVA_1$, rather than the this pointer minus $dVA_2$. After construction, when function f1 is invoked for a class B object or for a class A object that is type cast from a class B object, adjustor 343 corrects for the difference between $dVA_1$ and $dVA_2$ before function A::f1 323 is invoked. Similarly, when function A::f1 323 is invoked during construction of a class B object by constructor A::A 324 for class A, the this pointer needs to be adjusted. Methods for adjusting the this pointer during construction are described below.

Figure 9:
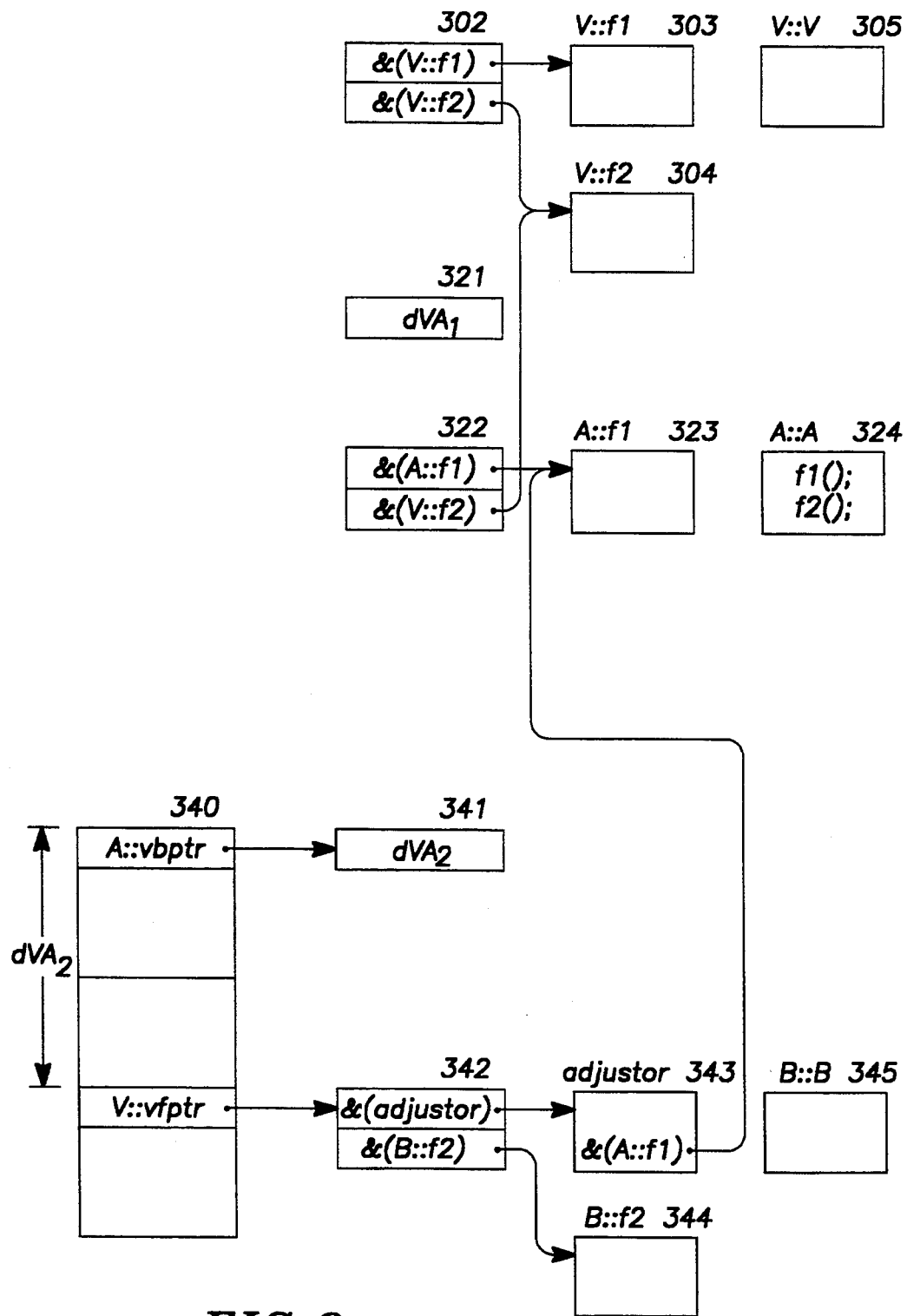
FIG. 9 is a schematic diagram of a class B object before the constructor of class B is invoked.

FIG. 9 is a schematic diagram of a class B object before the constructor of class B is invoked. Before constructor B::B 345 for class B is invoked, the virtual function table pointer V::vfptr is set to point to the virtual function table 342 for class B. If constructor B::B 345 invokes virtual function f1, it will access function A::f1 323 through adjustor 343. Adjustor 343 corrects the this pointer before invoking function A::f1 323.

As shown in the above examples, during construction of a derived class, the constructor of each base class is invoked to initialize the occurrence of the base class within the derived class. When a constructor for a base class is invoked, the virtual function table pointer for the object being constructed is set to point to the virtual function table associated with the base class. This allows the constructor for each base class to access the functions associated with the base class, rather than the overriding functions. However, as indicated above, problems may arise when a class that virtually inherits a base class defines a constructor that invokes a virtual function. An analogous problem occurs when a destructor is invoked during destruction of an object.

Referring again to FIG. 8, to correct this incorrect calculation, the this pointer needs to be adjusted by the value $dVA_2-dVA_1$, before constructor A::A 324 is invoked during construction of a class B object. The value $dVA_2-dVA_1$ is the difference between the offset between the this pointer and the virtual base table pointer A::vbptr (the class address) in a class B object and the offset between the this pointer and the virtual base table pointer A::vbptr (the class address) in a class A object.

Figure 10:
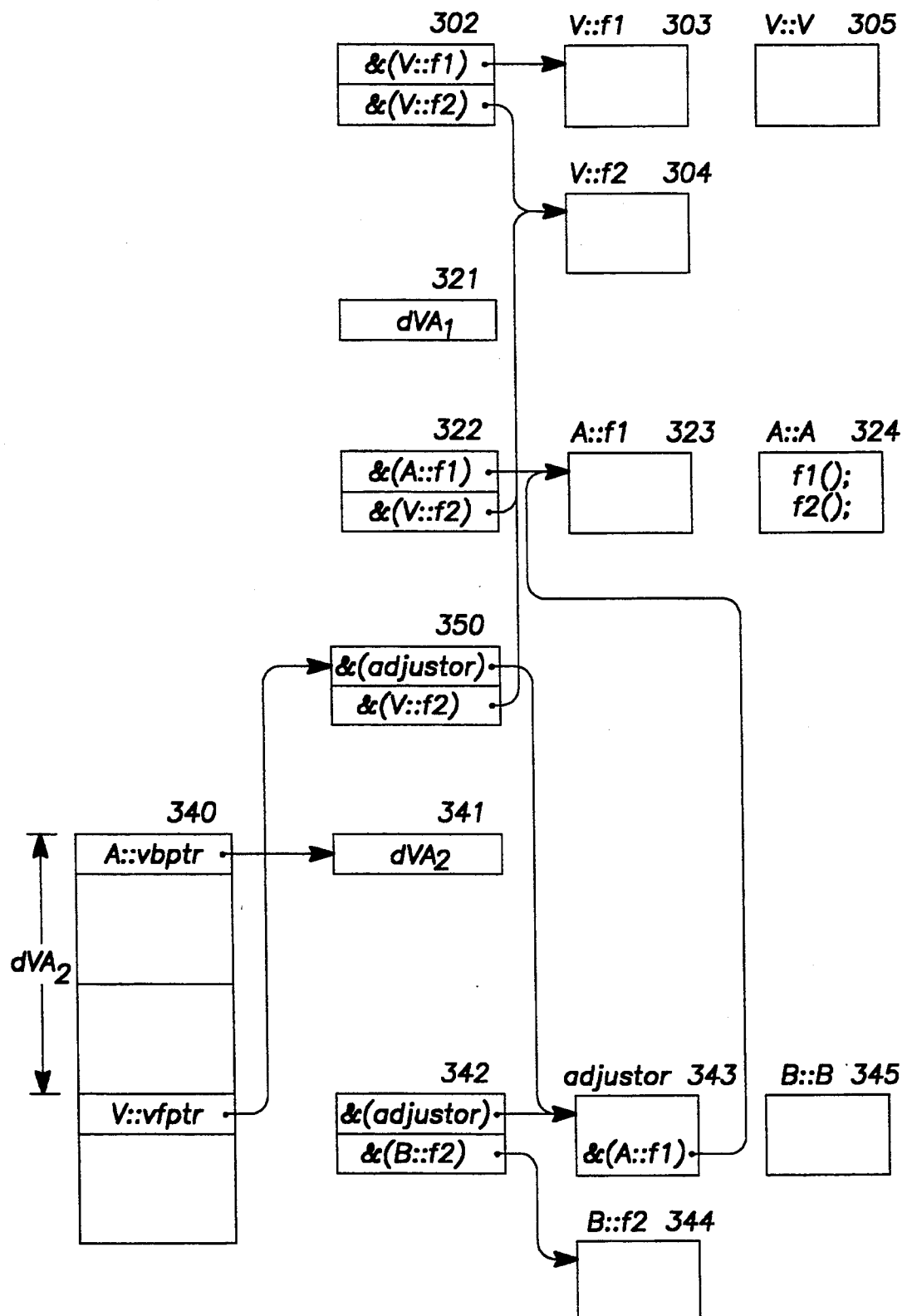
FIG. 10 shows a virtual function table to be used when constructor A::A of class A is invoked during construction of an object of class B.

In one embodiment, a second virtual function table for class A is generated to be used during construction of a class B object. FIG. 10 shows a virtual function table 350 to be used when constructor A::A 324 is invoked during construction of a class B object. The virtual function table 350 contains the address of the adjustor 343 and the address of function V::f2 304. Before constructor A::A 324 is invoked during construction of a class B object, the virtual function table pointer V::vfptr is temporarily set to point to the virtual function table 350. Constructor A::A 324 then invokes the function A::f1 323 through adjustor 343. Adjustor 343 adjusts the this pointer by the amount $dVA_2-dVA_1$ before transferring to function A::f1 323. Thus, function A::f1 323 will correctly access the virtual base table pointer A::vbptr in the class B object. In the example of FIG. 10, adjustor 343 was generated for class B. However, if class B had a function member that overrode function f1, then there would be no adjustor for class B. In that case, an adjustor would need to be generated explicitly for the second virtual function table 350. In this embodiment, a separate "construction" virtual function table would typically be needed for each class that inherits class A.

In an alternate embodiment, an adjustor is generated for each virtual function that overrides a virtual function in a virtual base class. A construction displacement field for each virtual base class with a virtual function that is overridden by the derived class is allocated in the class data structure for the derived class. The construction displacement field is preferably stored before the occurrence of the virtual base class. Each adjustor retrieves the value in construction displacement field for the associated virtual base class, adjusts the this pointer by the retrieved value, and transfers to overriding function. Except during construction, the construction displacement fields contain a 0 value. Thus, the adjustor does not adjust the this pointer. However, during construction when a constructor for the class that defines the overriding function is invoked, the construction displacement field is set to the difference between the offset of the class address from the this pointer in the object being constructed and the offset of the class address from the this pointer in an object of the class associated with the constructor.

Figure 11:
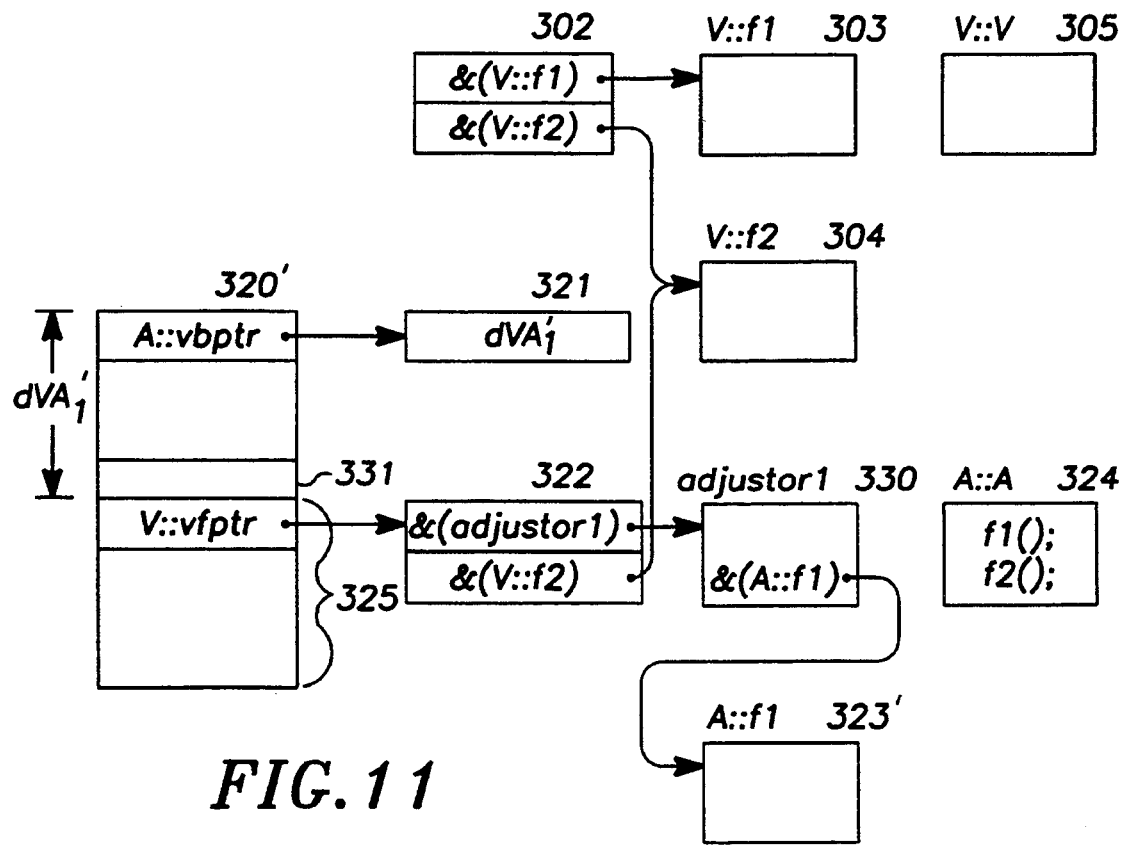
FIG. 11 is a schematic diagram of the structures for class A using a construction displacement field in a preferred embodiment.

FIG. 11 is a schematic diagram of the structures for class A using a construction displacement field in a preferred embodiment. Data structure 320' contains an occurrence of class V 325, a virtual base table pointer A::vbptr, data members for class A, and construction displacement field 331. Virtual base table pointer A::vbptr points to the virtual base table 321, which contains the offset of the this pointer from the virtual base table pointer A::vbptr (the class address). Virtual function table pointer V::vfptr points to virtual function table 322, which contains the address of adjustor1 330 and the address of function V::f2 304. Adjustor1 330 adjusts the this pointer by the amount in the construction displacement field 331 and jumps to function A::f1 323'. Adjustor1 330 adjusts the this pointer by the following statement:

this -= *(& (this)-1)

During and after construction of an object of class A, the construction displacement field 331 is set to 0. Thus, adjustor1 330 does not change the this pointer during construction an instance of a class A object.

Figure 12B:
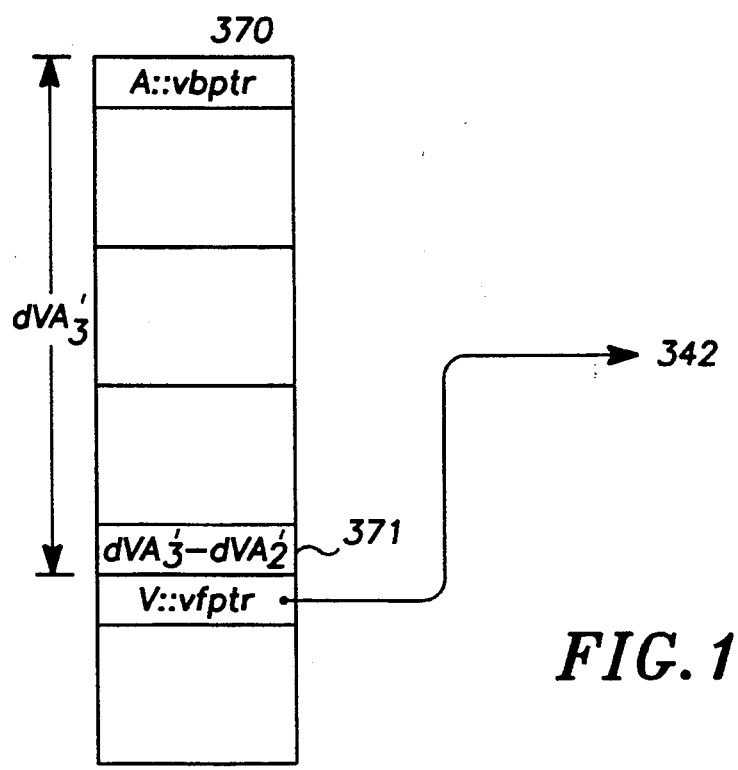
FIG. 12B is a schematic diagram that shows the interaction between adjustor2 and adjustor1 during construction in a preferred embodiment.
Figure 12A:
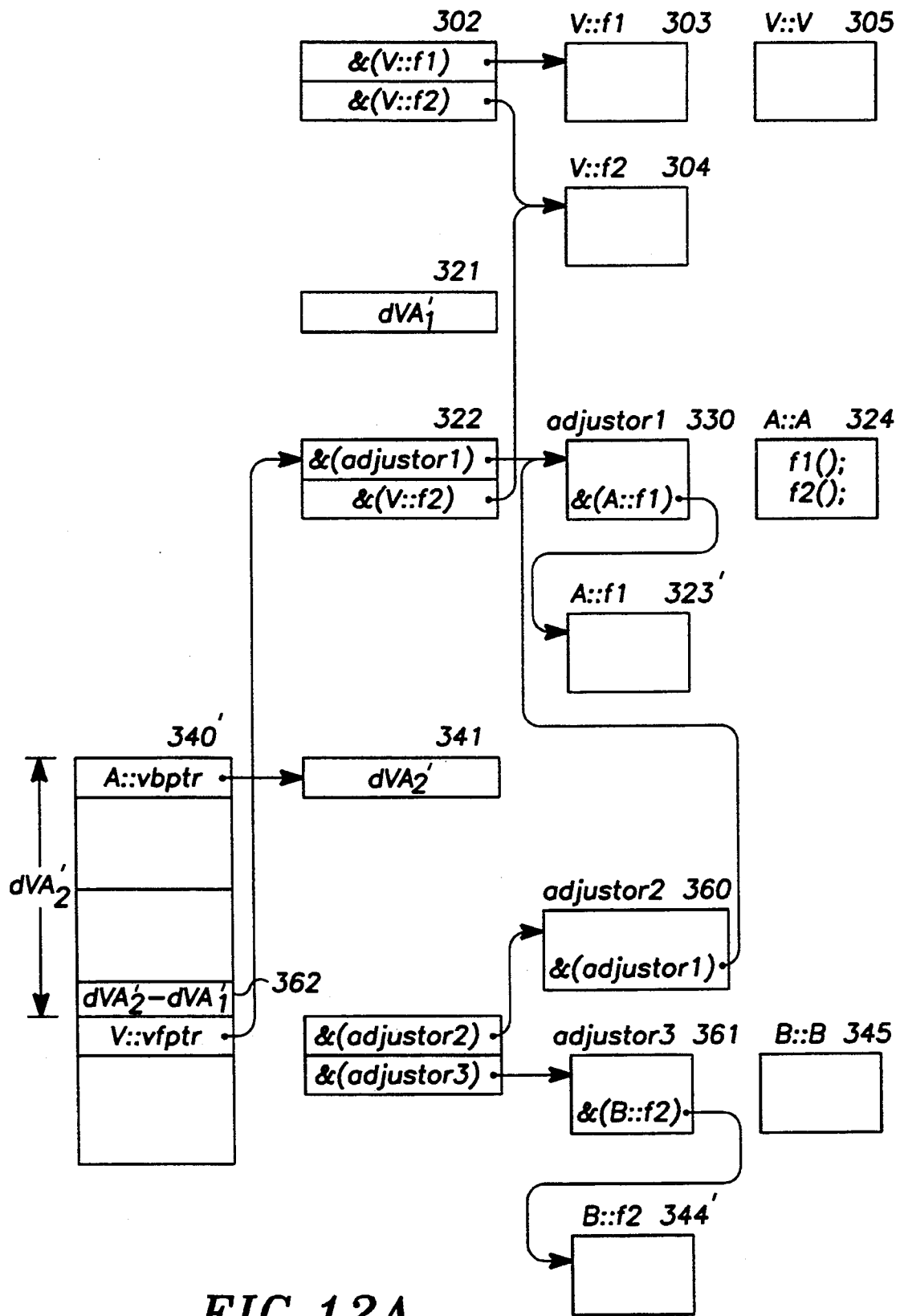
FIG. 12A is a schematic diagram of the structures for an object of class B before a call is made to the constructor A::A of class A in a preferred embodiment.

FIG. 12A is a schematic diagram of the structures for an object of class B before a call is made to the constructor A::A of class A in a preferred embodiment. The data structure 340' contains construction displacement field 362 and virtual function table pointer V::vfptr, which temporarily points to virtual function table 322 for class A. The construction displacement field 362 contains the value $dVA_2' - dVA_1'$. The this pointer points to the virtual function table pointer V::vfptr of the class B object when constructor A::A 324 is invoked. When constructor A::A 324 invokes virtual functions f1 and f2 through virtual function table 322, it sets the this pointer for these functions to the this pointer it was passed. Adjustor1 330 adjusts the this pointer by the value in the construction displacement field 362. Thus, when function A::f1 323' calculates the address of the virtual base table pointer A::vbptr (the class address), it subtracts $dVA_1'$ from the this pointer, which adjustor1 330 adjusted by $dVA_2' - dVA_1'$. The net result is that $$\text{class address} = (\text{this} - (dVA_2' - dVA_1')) - dVA_1'$$
$$= \text{this} - dVA_2'$$

Thus, function A::f1 323' calculates the correct address for the virtual base table pointer A::vbptr (the class address) in a class B object and function A::f1 323' can correctly initialize the occurrence of a class A object within the object of class B object.

Because class B virtually inherits class V, a construction adjustor is needed for the overriding function B::f2 344'. Adjustor3 361 adjusts the this pointer by the current value in the construction displacement field 362 and transfers control to function B::f2 344'. Since function f1 is not overridden in class B, adjustor2 360 adjusts the this pointer by $dVA_2' - dVA_1'$ before transferring control to function A::f1 323'. Instead of transferring control directly to function A::f1 323, adjustor2 transfers control through adjustor1 330, which is a construction displacement adjustor. Alternatively, the construction displacement adjustment could be incorporated into adjustor2 360 in which case adjustor2 360 would transfer control directly to function A::f1 323' after adjusting the this pointer twice.

FIG. 12B is a schematic diagram that shows the interaction between adjustor2 and adjustor1 during construction in a preferred embodiment. In the following declaration, class C inherits class B.

---
class C : B
{ ... };
---

Referring to FIG. 12B, the data structure 370 for class C contains construction displacement field 371 and virtual function table pointer V::vfptr, which before invoking constructor B::B 345, points to the virtual function table 342 for class B as shown in FIG. 12A. Before constructor B::B 345 is invoked, the value of $dVA_3' - dVA_2'$ is stored in construction displacement field 371. The value $dVA_2'$ is retrieved from the virtual base table 341 for class B. When constructor B::B 345 invokes function f1, adjustor2 and adjustor1 adjust the this pointer as follows:

adjustor2: this-=$dVA_2'-dVA_1'$ adjustor1: this-=$dVA_3'-dVA_2'$

The result is that function A::f1 323' is passed the this pointer with a value of this-$dVA_3'+dVA_1'$. Thus, when function A::f1 323' subtracts $dVA_1'$ from the this pointer to determine the address of the virtual base pointer A::vbptr (the class address), the result is this-$dVA_3'$, which is the correct address of the virtual base pointer A::vbptr in a class C object.

Figure 13A:
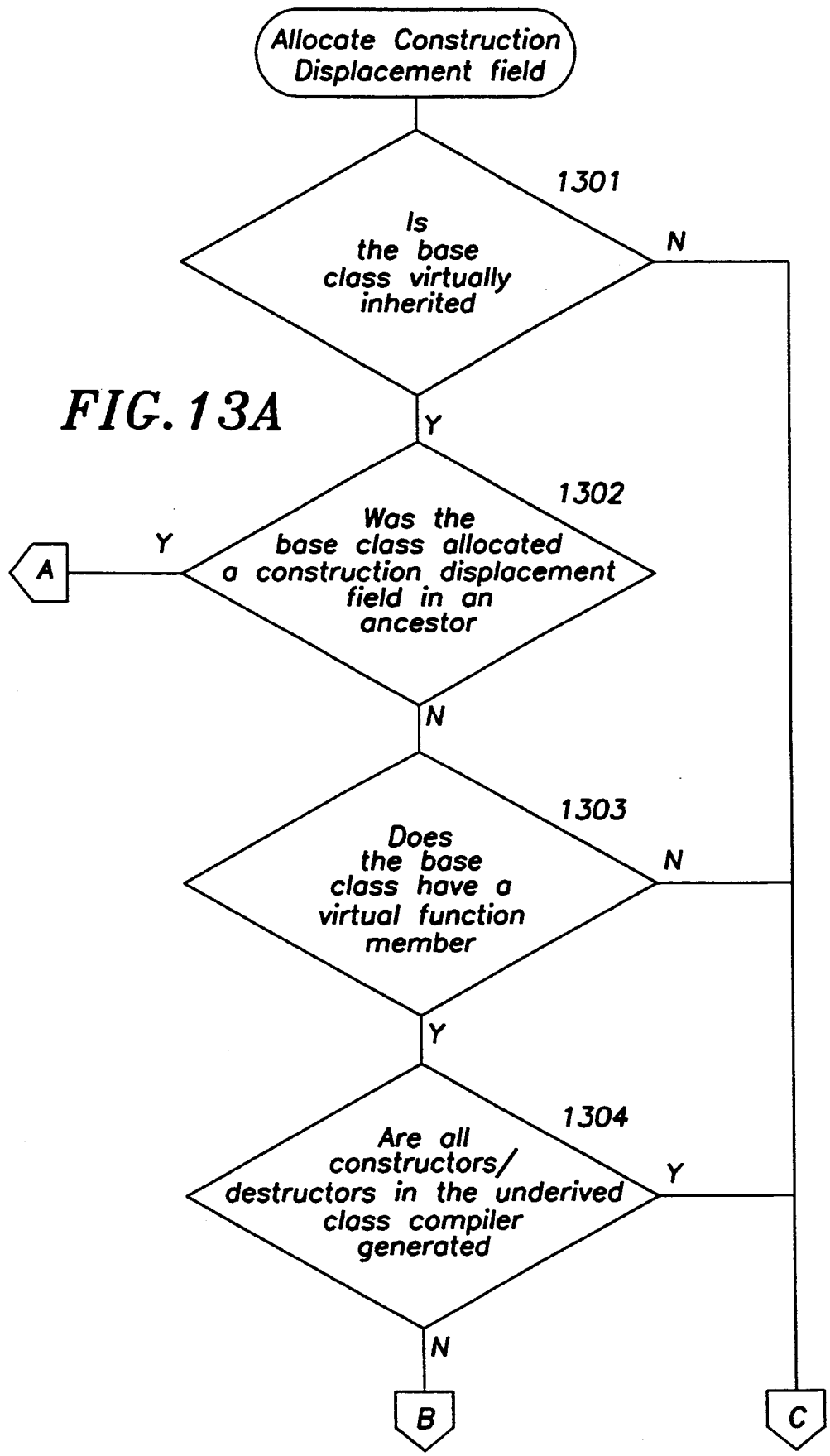
FIGS. 13A and 13B are a flow diagram of a routine for determining whether a construction displacement field is to be allocated for an inherited class.
Figure 13B:
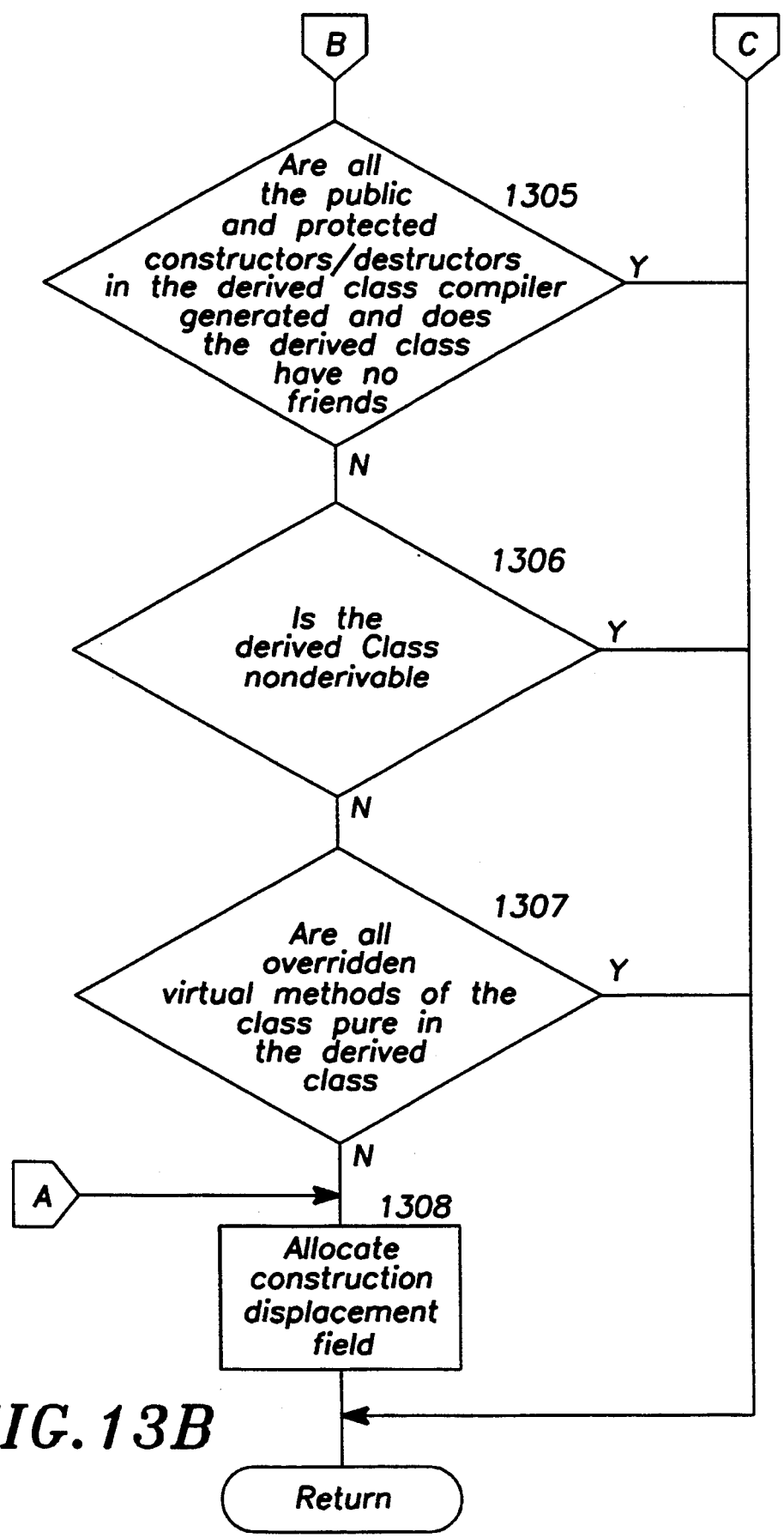

FIGS. 13A and 13B are a flow diagram of a routine for determining whether a construction displacement field needs to be allocated for an inherited class. The flow diagram corresponds to a procedure AllocateConstructionDisplacementField, which is passed a direct or indirect base class of a derived class and allocates a construction displacement field for the occurrence of the base class within the derived class. One skilled in the art would appreciate that a construction displacement field could be allocated for each virtually inherited class. However, this routine seeks to allocate a construction displacement field only when necessary. One skilled in the art would also appreciate that by evaluating the call trees for constructors and destructors to determine whether virtual functions are called further optimization would be possible. In step 1301, if the base class is not virtually inherited, then no construction displacement field is needed and the procedure returns, else the procedure continues at step 1302. In step 1302, if the base class was allocated a construction displacement field in an ancestor class, then a construction displacement field is needed and the procedure continues at step 1308, else the procedure continues at step 1303. In step 1303, if the base class does not have a virtual function member (except possibly a virtual destructor), then no construction displacement field is needed and the procedure returns, else the procedure continues at step 1304. Since the results of recursively invoking a destructor are undefined in C++, a base class whose only virtual method is a destructor does not need a construction displacement field. The destructor cannot invoke any virtual function with a defined result. In step 1304, if all the constructors and destructors in the derived class are compiler generated, then no construction displacement field is needed and the procedure returns, else the procedure continues at step 1305. Compiler generated constructors and destructors do not invoke virtual functions. In step 1305, if all the public and protected constructors and destructors in the derived class are compiler generated and the derived class has no friend classes, then no construction displacement field is needed and the procedure returns, else the procedure continues at step 1306. Private noncompiler-generated constructors and destructors cannot be called by a derived class that is not a friend class because they are inaccessible. In step 1306 if the derived class is non-derivable, then no construction displacement field is needed and the procedure returns, else the procedure continues at step 1307. A class can be non-derivable because the compiler defines a key word for indicating that a class cannot be a base class or the compiler itself may determine that in certain situations a class cannot be a base class. In step 1307, if all the overridden virtual methods (except possibly a virtual destructor) of the base class are pure in the derived class, then no construction displacement field is needed and the procedure returns, else the procedure continues at step 1308. In step 1308, the procedure allocates a construction displacement field immediately before the allocation of the base class and returns.

Although the present invention has been described in terms of preferred embodiments, it is not intended that the invention be limited to these embodiments. Modifications within the spirit of the invention will be apparent to those skilled in the art. For example, one skilled in the art would appreciate that a similar problem occurs during destruction of an object and that the use of a construction displacement field can correct this problem. The scope of the present invention is defined by the claims that follow.

What is claimed is:

1. A method in a computer system for constructing an instance of an object, the method comprising the computer-implemented steps of:

receiving a declaration of a first class, wherein the first class defines a first class object and wherein the first class defines a virtual function;

receiving a declaration of a second class, wherein the second class defines a second class object, wherein an instance of a second class object has an instance address, wherein the second class virtually inherits the first class, wherein a first class object occurs within an instance of a second class object at an offset from the instance address of a second class object, wherein the second class defines a virtual function that overrides the virtual function of the first class, wherein the overriding virtual function is passed a this pointer when invoked, wherein when the virtual function is invoked for an instance of a second class object the passed this pointer points to the occurrence of the first class object within the instance of the second class object, wherein the overriding virtual function determines the instance address of a second class object by adjusting the passed this pointer by the offset, wherein the second class defines a constructor, and wherein the constructor invokes the overriding virtual function;

receiving a declaration of a third class, wherein the third class defines a third class object, wherein the third class inherits the second class, and wherein a second class object occurs within an instance of a third class object; and when constructing an instance of a third class object,
before executing the constructor of the second class, setting a this pointer for the constructor of the second class to point to the occurrence of the second class object within the instance of the third class object;
executing the constructor of the second class;
before invoking the overriding virtual function, setting a this pointer for the overriding virtual function to point to an offset from the occurrence of the second class object within the third class object, wherein the offset is the same as the offset of the occurrence of the first class object within an instance of a second class object from the instance address of a second class object; and
invoking the overriding virtual function, wherein the overriding virtual function adjusts the this pointer to point to the occurrence of the second class object within the instance of the third class object.

2. The method of claim 1 wherein the step of setting a this pointer for the overriding virtual function includes the steps of:

setting the this pointer to point to the occurrence of the first class object within the occurrence of the second class object within the instance of the third class object; and adjusting the this pointer by the difference between the offset of an occurrence of a first class object within an instance of a second class object and the offset of the occurrence of a first class object from an occurrence of a second class object within an instance of a third class object.

3. The method of claim 2 wherein the value of the difference is stored in the instance of the third class object before invoking the constructor for the second class object.

4. A method in a computer system of constructing an object, the method comprising the computer-implemented steps of:

allocating a construction displacement field in an object of a derived class that inherits a base class that virtually inherits a class; and during construction of the object of the derived class,
setting the construction displacement field to a value to reflect differences between an occurrence of the base class within the derived class and an occurrence of the base class when the base class is not inherited;
invoking a constructor of the base class to construct an occurrence of the base class within the object; and
during execution of the constructor,
setting a this pointer for a virtual function;
adjusting the this pointer by the value in the construction displacement field; and
invoking the virtual function whereby the virtual function uses the adjusted this pointer to access the occurrence of the base class within the object.

5. The method of claim 4 wherein the virtual function overrides a virtual function defined in the virtually inherited class.

6. The method of claim 4 including the step of setting the value of the construction displacement field to a zero value after execution of the constructor.

7. The method of claim 4 wherein the construction displacement field is allocated at a predefined offset from an occurrence of the virtually inherited class.

8. The method of claim 4 wherein the construction displacement field is stored adjacent to an occurrence of the virtually inherited class.

9. The method of claim 4 wherein the step of setting the construction displacement field sets the construction displacement field to the difference between the offset of an occurrence of the virtually inherited class within an object of the base class and the offset of an occurrence of the virtually inherited class from an occurrence of the base class within an object of the derived class.

10. The method of claim 9 wherein the virtual function overrides a virtual function defined in the virtually inherited class.

11. A method in a computer system for determining when to allocate a construction displacement field within an object of a derived class for an occurrence of a base class, the method comprising the computer-implemented steps of:

determining whether the derived class virtually inherits the base class; and when the derived class virtually inherits the base class, allocating a construction displacement field for the occurrence of the base class.

12. The method of claim 11 including the step of suppressing the allocating of the construction displacement field when the base class has no function members designated as virtual.

13. The method of claim 11 including the step of suppressing the allocating of the construction displacement field when the derived class has no constructor or destructor that invokes a virtual function.

14. The method of claim 11 including the step of suppressing the allocating of the construction displacement field when no constructor or destructor that is designated as public or protected in the derived class invokes a virtual function and no class is designated as a friend class of the derived class.

15. The method of claim 11 including the step of suppressing the allocating of the construction displacement field when the derived class in non-derivable.

16. The method of claim 11 including the step of suppressing the allocating of the construction displacement field when all virtual functions of the base class that are overridden are pure in the derived class.

17. A method in a computer system of destructing an object, the method comprising the computer-implemented steps of:
allocating a construction displacement field in an object of a derived class that inherits a base class that virtually inherits a class; and
during destruction of the object of the derived class,
setting the construction displacement field to a non-zero value;
invoking a destructor of the base class to destruct an occurrence of the base class within the object; and
during execution of the destructor,
setting a this pointer for a virtual function;
adjusting the this pointer by the value in the construction displacement field; and
invoking the virtual function whereby the virtual function uses the adjusted this pointer to access the occurrence of the base class within the object.

18. The method of claim 17 wherein the virtual function overrides a virtual function defined in the virtually inherited class.

19. The method of claim 17 including the step of setting the value of the construction displacement field to a zero value after execution of the destructor.

20. The method of claim 17 wherein the construction displacement field is stored at a predefined offset from an occurrence of the virtually inherited class.

21. The method of claim 17 wherein the construction displacement field is stored adjacent to an occurrence of the virtually inherited class.

22. The method of claim 17 wherein the step of setting the construction displacement field sets the construction displacement field to the difference between the offset of an occurrence of the virtually inherited class within an object of the base class and the offset of an occurrence of the virtually inherited class from an occurrence of the base class within an object of the derived class.

23. The method of claim 22 wherein the virtual function overrides a virtual function defined in a virtually inherited class.

24. A compiler in a computer system comprising:
means for setting a construction displacement field to a non-zero value;
means for generating code for setting a this pointer for a virtual function when executing a constructor or destructor;
means for generating code for adjusting the this pointer by the value in the construction displacement field before execution of the virtual function and when executing a constructor or destructor; and
means for generating code for invoking the virtual function when executing a constructor or destructor, whereby the virtual function uses the adjusted this pointer to access an occurrence of a base class when an base class within an object of a derived class.

25. The compiler of claim 24 wherein the virtual function overrides a virtual function defined in a virtually inherited class.

26. The compiler of claim 24 including means for generating code for setting the value of the construction displacement field to a zero value after execution of a constructor or destructor.

27. The compiler of claim 24 including means for generating code for allocating a construction displacement field in an object of a derived class that inherits a base class that virtually inherits a class.

28. The complier of claim 27 wherein the construction displacement field is allocated at a predefined offset from an occurrence of the virtually inherited class.

29. The complier of claim 27 wherein the construction displacement field is allocated adjacent to an occurrence of the virtually inherited class.

30. The compiler of claim 24 wherein means for generating code for setting the construction displacement field sets the construction displacement field to the difference between an offset of an occurrence of the virtually inherited class within an object of the base class and an offset of an occurrence of the virtually inherited class from an occurrence of the base class within an object of the derived class.

31. The compiler of claim 30 wherein the virtual function overrides a virtual function defined in the virtually inherited class.

32. A method in a computer system for constructing a derived object of a derived class, the derived class inheriting a base class, the base class having a virtual function that is generated to access an occurrence of the base class when the base class is not inherited, the method comprising the computer-implemented steps of:
before invoking a constructor for the base class during construction of the derived object, adjusting for differences between an occurrence of the base class within the derived class and an occurrence of the base class when the base class is not inherited; and
invoking the constructor whereby the constructor can invoke the virtual function and the invoked virtual function can correctly access the occurrence of the base class within the derived class based on the adjustments.

33. The method of claim 32 wherein the base class virtually inherits a virtual base class and the virtual function overrides a virtual function defined in the virtual base class and wherein the step of adjusting for differences includes setting a value to reflect any differences resulting from the base class virtually inheriting the virtual base class.

34. The method of claim 33 including the steps of allocating a construction displacement field for the virtual base class; before invoking the constructor, setting the construction displacement field to a value to reflect differences resulting from the base class virtually inheriting the virtual base class; and during invocation of the constructor, invoking the overriding virtual function passing a this pointer wherein an adjustor adjusts the this pointer by the value of the construction displacement field before executing the overriding virtual function.

35. The method of claim 34 wherein the step of invoking the overriding virtual function invokes the overriding virtual function directly from the constructor.

36. The method of claim 34 wherein the step of invoking the overriding virtual function invokes the overriding virtual function indirectly from the constructor through a function that is invoked by the constructor.

37. The method of claim 34 wherein the derived class does not override the virtual function.

38. The method of claim 33 wherein the derived class does not override the virtual function.

39. The method of claim 33 including the step of, after invoking the constructor, resetting the value to reflect the occurrence of the base class within the derived class.

40. The method of claim 32 including the step of invoking the virtual function passing a this pointer that reflects adjusting for differences.

41. The method of claim 32 wherein the step of adjusting for differences includes the step of setting a value to reflect the differences.

42. The method of claim 32 wherein the derived object has a virtual function table and wherein step for adjusting for differences includes setting the virtual function table for the derived object to an alternate virtual function table wherein the virtual function is invoked through the alternate virtual function table during construction of the derived object.

43. The method of claim 42 wherein the alternate virtual function table contains a reference to an adjuster that adjusts for differences between an occurrence of the base class within the derived class and an occurrence of the base class when the base class is not inherited and that executes the virtual function.

44. The method of claim 42 wherein the base class virtually inherits a virtual base class and the virtual function overrides a virtual function defined in the virtual base class.

45. A method in a computer system of constructing a derived object of a derived class, the derived class inheriting a base class, the base class virtually inheriting a virtual base class, the method comprising the computer-implemented steps of:
allocating a construction displacement field for the derived object; and
during construction of the derived object,
setting the construction displacement field to a value representative of differences between an occurrence of the base class within the derived object and an occurrence of the base class when the base class is not inherited;
invoking a constructor of the base class to construct the occurrence of the base class within the derived object; and
during execution of the constructor,
setting a this pointer for a virtual function;
adjusting the this pointer based on the value in the construction displacement field; and
invoking the virtual function whereby the virtual function uses the adjusted this pointer to access the occurrence of the base class within the derived object.

46. The method of claim 45 including the step of setting the construction displacement field sets the construction displacement field to the difference between an offset of an occurrence of the virtual base class within an object of the base class and an offset of an occurrence of the virtual base class of an object of the derived class.

47. The method of claim 46 wherein the derived object contains an indication of an occurrence of the virtual base class within the derived object, wherein the step of setting the construction displacement field includes the step of retrieving the indication of the occurrence of the virtual base class within the derived object and retrieving an indication of an occurrence of the virtual base class within an object of the base class that is established during compile time.

48. A method in a computer system of constructing an occurrence of an intermediate class in a derived class, the derived class inheriting the intermediate class, the intermediate class virtually inheriting a base class, the intermediate class having a virtual function that overrides a virtual function in the base class, the overriding virtual function generated to access an object of the intermediate class based on a predefined layout, the method comprising the computer-implemented steps of:
before invoking a constructor for the intermediate class to construct an occurrence of the intermediate class within the derived class, determining layout differences between a layout of an occurrence of the intermediate class in the derived class and a layout of an object of the intermediate class; and
invoking the constructor whereby the constructor can access the overriding function based on the determined layout differences.

49. A method in a computer system for destructing a derived object of a derived class, the derived class inheriting a base class, the base class having a virtual function that is generated to access an occurrence of the base class when the base class is not inherited, the method comprising the computer-implemented steps of:
before invoking a destructor for the base class during destruction of the derived object, adjusting for differences between an occurrence of the base class within the derived class and an occurrence of the base class when the base class is not inherited; and
invoking the destructor whereby the destructor can invoke the virtual function based on the differences.

50. The method of claim 49 wherein the base class virtually inherits a virtual base class and the virtual function overrides a virtual function defined in the virtual base class and wherein the step of adjusting for differences includes setting a value to reflect any differences resulting from the base class virtually inheriting the virtual base class.

51. The method of claim 50 including the steps of allocating a destruction displacement field for the virtual base class; before invoking the destructor, setting the destruction displacement field to a value to reflect differences resulting from the base class virtually inheriting the virtual base class; and during invocation of the destructor, invoking the overriding virtual function passing a this pointer wherein an adjustor adjusts the this pointer by the value of the destruction displacement field before executing the overriding virtual function.

52. The method of claim 51 wherein the step of invoking the overriding virtual function invokes the overriding virtual function directly from the destructor.

53. The method of claim 51 wherein the step of invoking the overriding virtual function invokes the overriding virtual function indirectly from the destructor through a function that is invoked by the destructor.

54. The method of claim 51 wherein the derived class does not override the virtual function.

55. The method of claim 50 wherein the derived class does not override the virtual function.

56. The method of claim 50 including the step of, after invoking the destructor, resetting the value to reflect the occurrence of the base class within the derived class.

57. The method of claim 50 including the step of invoking the virtual function passing a this pointer that reflects adjusting for differences.

58. The method of claim 50 wherein the step of adjusting for differences includes the step of setting a value to reflect the differences.

59. A compiler in a computer system comprising:
means for generating code for a constructor for a base class;
means for generating code for a virtual function of the base class, the virtual function for accessing an occurrence of the base class when the base class is not inherited;
means for generating code to adjust for differences between an occurrence of the base class in a derived class and an occurrence of the base class when the base class is not inherited; and
means for generating code for invoking the constructor whereby the constructor can invoke the virtual function and the invoked virtual function can correctly access the occurrence of the base class in the derived class based on the differences.

60. The compiler of claim 59 further including:
means for generating code for the constructor when the base class virtually inherits a virtual base class;
means for generating code for the virtual function when the virtual function overrides a virtual function defined in the virtual base class; and
means for generating code to adjust for differences resulting from the base class virtually inheriting the virtual base class.

61. The compiler of claim 60 further including:
means for generating code for allocating a construction displacement field for the virtual base class;
means for generating code for setting the construction displacement field to a value to reflect differences resulting from the base class virtually inheriting the virtual base class; and
means for generating code for invoking the overriding virtual function passing a this pointer wherein an adjustor adjusts the this pointer by the value of the construction displacement field before executing the overriding virtual function.

62. The compiler of claim 61 further including:
means for generating code for invoking the overriding virtual function directly from the constructor.

63. The compiler of claim 61 further including:
means for generating code for invoking the overriding virtual function indirectly from the constructor through a function that is invoked by the constructor.

64. The compiler of claim 61 wherein the derived class does not override the virtual function.

65. The compiler of claim 60 wherein the derived class does not override the virtual function.

66. The compiler of claim 60 including means for generating code for adjusting to reflect the occurrence of the base class within the derived class.

67. The compiler of claim 59 including means for generating code for adjusting to reflect the occurrence of the base class within the derived class.

68. A method in a computer system for accessing a virtual function when constructing a derived object of a derived class, the derived class inheriting a base class, the base class virtually inheriting a virtual base class, the virtual function being defined in the base class to override a virtual function in the virtual base class, the overriding virtual function for accessing an occurrence of the base class when the base class is not inherited, the method comprising the computer-implemented steps of:
adjusting for differences between an occurrence of the base class within the derived class and an occurrence of the base class when the base class is not inherited;
invoking a constructor of the base class during construction of the derived object; and
during execution of the constructor, invoking the overriding virtual function wherein the overriding virtual function correctly accesses the occurrence of the base class within the derived object based on the differences.

69. The method of claim 68 wherein the step of adjusting for differences includes setting a virtual function table for the derived object to an alternate virtual function table, the alternate virtual function table referencing an adjustor to adjust for the differences before invoking the overriding virtual function.

70. The method of claim 68 including the steps of setting a construction displacement field to a value to reflect the differences and adjusting a this pointer passed to the overriding virtual function based on the value in the construction displacement field.

71. A method in a computer system for constructing an object of a class, the method comprising the computer-implemented steps of:
allocating a construction displacement field for the object when the class virtually inherits a base class and when the class has a virtual function that overrides a virtual function in the base class; and
during construction of an occurrence of the class when the class is not inherited, setting the construction displacement field to a value to indicate that the class is not inherited;
invoking a constructor for the class; and
during invocation of the constructor, invoking the overriding virtual function passing a this pointer that is based on the value in the construction placement field.

72. The method of claim 71 wherein the class is inherited by a derived class and including the steps of:
during construction of an occurrence of the class within the derived class,
setting the construction displacement field to a value to indicate that the class is inherited by the derived class;
invoking the constructor for the class; and
during invocation of the constructor, invoking the overriding virtual function passing a this pointer that is based on the value in the construction placement field.

73. A method in a computer system for constructing and destructing a derived object of a derived class, the derived class inheriting a base class having a virtual function that is generated to access an occurrence of the base class when the base class is not inherited, the method comprising the computer-implemented steps of:

setting a field to indicate differences between an occurrence of the base class within the derived class and an occurrence of the base class when the base class is not inherited so that during construction of the derived object a constructor can invoke the virtual function and the invoked virtual function can correctly access the occurrence of the base class within the derived class based on the setting of the field;

setting the field to indicate that construction of the derived object is complete so that when the virtual function is invoked it can correctly access the occurrence of the base class within the derived class based on the setting of the field; and setting the field to indicate differences between an occurrence of the base class within the derived class and an occurrence of the base class when the base class is not inherited so that during destruction of the derived object a destructor can invoke the virtual function and the invoked virtual function can correctly access the occurrence of the base class within the derived class based on the setting of the field.

74. A method in a computer system for constructing and destructing a derived object of a derived class, the derived class inheriting a base class having a virtual function that is generated to access an occurrence of the base class when the base class is not inherited, the method comprising the computer-implemented steps of:

allocating a field for an occurrence of the base class within the derived class;

setting the field to indicate differences between an occurrence of the base class within the derived class and an occurrence of the base class when the base class is not inherited whereby the derived object accesses the occurrence of the base class within the derived class based on the setting of the field when constructing or destructing the derived object.

75. A method in a computer system for constructing a derived object of a derived class, the derived class inheriting a base class having a virtual function that is generated to access an occurrence of the base class when the base class is not inherited, the method comprising the computer-implemented steps of:

allocating a field for an occurrence of the base class within the derived class;

setting the field to indicate differences between an occurrence of the base class within the derived class and an occurrence of the base class when the base class is not inherited whereby the derived object access the occurrence of the base class within the derived class based on the setting of the field when constructing or destructing the object.

* * * * *

UNITED STATES PATENT AND TRADEMARK OFFICE
CERTIFICATE OF CORRECTION

PATENT NO. : 5,371,891

DATED : December 6, 1994

INVENTOR(S) : Jan Gray et al.

It is certified that error appears in the above-identified patent and that said Letters Patent is hereby corrected as shown below:

On the cover page under item [75], after "Bryanstown," please delete "Islamic Rep. of Iran" and substitute therefor --Ireland--.

Signed and Sealed this

Twenty-sixth Day of September, 1995

Attest:

BRUCE LEHMAN

Attesting Officer  Commissioner of Patents and Trademarks